(12) United States Patent
D'Souza et al.

(10) Patent No.: US 9,896,339 B2
(45) Date of Patent: Feb. 20, 2018

(54) CARBON MONOXIDE PRODUCTION FROM CARBON DIOXIDE REDUCTION BY ELEMENTAL SULFUR

(71) Applicant: SABIC Global Technologies B.V., Bergen op Zoom (NL)

(72) Inventors: Lawrence D'Souza, Bangalore (IN); Justin Johnson, Washington, DC (US); Jessica Scaranto, Congeliano (IT)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 14/882,834

(22) Filed: Oct. 14, 2015

(65) Prior Publication Data

US 2016/0107893 A1   Apr. 21, 2016

Related U.S. Application Data

(60) Provisional application No. 62/065,427, filed on Oct. 17, 2014.

(51) Int. Cl.
*C01B 17/50* (2006.01)
*C01B 31/18* (2006.01)

(52) U.S. Cl.
CPC ............ *C01B 31/18* (2013.01); *C01B 17/508* (2013.01)

(58) Field of Classification Search
CPC ........ C01B 31/18; C01B 31/50; C01B 31/508
See application file for complete search history.

(56) References Cited

U.S. PATENT DOCUMENTS

| | | | |
|---|---|---|---|
| 1,793,677 A | 2/1931 | Casale | 423/656 |
| 1,796,377 A | 3/1931 | King | 246/63 C |
| 2,080,360 A | 5/1937 | Lepsoe | 423/570 |
| 2,102,081 A | 12/1937 | Lepsoe | 423/569 |
| 2,892,685 A | 6/1959 | Paull | 423/655 |
| 3,758,673 A | 9/1973 | Buben et al. | 423/418.2 |
| 3,764,661 A | 10/1973 | Kanazawa et al. | 423/416 |
| 4,003,986 A | 1/1977 | Lewis | 423/578.4 |
| 4,039,650 A | 8/1977 | Daley | 423/569 |
| 4,302,425 A | 11/1981 | Gamel | 422/161 |

(Continued)

FOREIGN PATENT DOCUMENTS

| | | |
|---|---|---|
| CA | 2791874 | 4/2013 |
| CA | 2791963 | 1/2014 |

(Continued)

OTHER PUBLICATIONS

Kim, Hyuk, et al. "Reduction of SO 2 by CO to elemental sulfur over Co 3 O 4-TiO 2 catalysts." Applied Catalysis B: Environmental 19.3 (1998): 233-243.*

(Continued)

*Primary Examiner* — Richard M Rump
(74) *Attorney, Agent, or Firm* — Norton Rose Fulbright US LLP

(57) ABSTRACT

Disclosed is a method of producing carbon monoxide (CO) and sulfur dioxide ($SO_2$), the method comprising obtaining a reaction mixture comprising carbon dioxide gas ($CO_2(g)$) and elemental sulfur gas ($S(g)$), and subjecting the reaction mixture to conditions sufficient to produce a product stream comprising $CO(g)$ and $SO_2(g)$.

20 Claims, 14 Drawing Sheets

(56) References Cited

U.S. PATENT DOCUMENTS

| | | | | |
|---|---|---|---|---|
| 4,374,819 | A | * | 2/1983 | Palilla ................ B01D 53/8603 423/570 |
| 5,346,679 | A | * | 9/1994 | Osaki ..................... C01B 31/18 423/210 |
| 5,366,717 | A | | 11/1994 | Dorchak et al. ............. 423/570 |
| 8,097,230 | B2 | | 1/2012 | Mesters et al. ............. 423/443 |
| 2004/0115492 | A1 | | 6/2004 | Galloway ..................... 429/426 |
| 2004/0146450 | A1 | | 7/2004 | Stauffer ........................ 423/443 |
| 2006/0288919 | A1 | | 12/2006 | Rameshni ..................... 110/345 |
| 2010/0242478 | A1 | | 9/2010 | Wojak ............................ 60/645 |
| 2011/0253551 | A1 | | 10/2011 | Lane et al. .................... 205/555 |

FOREIGN PATENT DOCUMENTS

| | | | | |
|---|---|---|---|---|
| GB | | 481058 A | 3/1938 | |
| WO | WO 8200632 A1 | * | 3/1982 | ........... B01J 12/005 |
| WO | WO 2014/132087 | | 9/2014 | |

OTHER PUBLICATIONS

Asadi et al., "Robust carbon dioxide reduction on molybdenum disulphide edges", *Nature Communications* 5(4470), 2014.

Ferguson, "The Equilibrium between Carbon Monoxide, Carbon Dioxide, Sulphur Dioxide, and Free Sulphur", *PNAS* 3:371-374, 1917.

Flytzani-Stephanopoulos et al., "Ceria-based catalysts for the recovery of elemental sulfur from $SO_2$-laden gas streams", *Catalysis Today* 62:145-458, 2000.

Han et al., "Catalytic reduction of sulfur dioxide with carbon monoxide over tin dioxide for direct sulfur recovery process", *Chemosphere* 72(11):1744-1750, 2008.

Happel et al., "Catalysts Composition Optimization for the Reduction of Sulfur Dioxide by Carbon Monoxide", *Ind. Eng. Chem. Prod. Res. Dev.* 16(2):150-154, 1977.

Hibbert et al. "Catalyst participation in the reduction of sulphur dioxide by carbon monoxide in the presence of water and oxygen", *J. Chem. Soc., Faraday Trans.* 1 74:1981-1989, 197.

Hibbert et al., "The reduction of sulphur dioxide by carbon monoxide on a $La_{0.5}Sr_{0.5}CoO_3$ catalyst", *Journal of Chemical Technology and Biotechnology* 29(12):713-722, 1979.

Karan et al., "COS-Forming Reaction between CO and Sulfur: A High-Temperature Intrinsic Kinetics Study", *Ind. Eng. Chem. Res.* 37(12):4609-4616, 1998.

Liu et al., "Reduction of sulfur dioxide by carbon monoxide to elemental sulfur over composite oxide catalysts", *Applied Catalysis B: Environmental* 4(2-3):167-186, 1994.

Paik et al., "The catalytic reduction of $SO_2$ to elemental sulfur with $H_2$ or CO", *Catalysis Today* 38(2):193-198, 1997.

Quinlan et al., "Kinetics and Yields for Sulfur Dioxide Reduction by Carbon Monoxide", *Ind. Eng. Chem. Process Des. Dev.* 12(1):107-111, 1973.

Ueno et al., *Chemistry Letters*, 9: 1067-1070, 1980.

Wang et al., "Selective catalytic reduction of sulfur dioxide by carbon monoxide over iron oxide supported on activated carbon", *Turkish Journal of Chemistry* 38:70-78, 2013.

Zhu et al., "Redox chemistry over $CeO_2$-based catalysts: $SO_2$ reduction by CO or $CH_4$", *Catalysis Today* 50:381-397, 1999.

Clark et al., *Industrial & Engineering Chemistry Research* 40(2):497-508, 2001.

International Search Report and Written Opinion for PCT/US2015/055500, dated Jan. 27, 2016.

Wang et al., *Energy and Fuels* 10(4):896-904, 1996.

* cited by examiner

CARBON MONOXIDE PRODUCTION FROM CARBON DIOXIDE REDUCTION BY ELEMENTAL SULFUR

CROSS REFERENCE TO RELATED APPLICATIONS

This application claims benefit to U.S. Provisional Patent Application No. 62/065,427, filed Oct. 17, 2014, titled "CARBON MONOXIDE PRODUCTION FROM CARBON DIOXIDE REDUCTION BY ELEMENTAL SULFUR".

BACKGROUND OF THE INVENTION

A. Field of the Invention

The invention generally concerns the production of carbon monoxide, sulfur dioxide, and carbonyl sulfide from the reduction of carbon dioxide by elemental sulfur. The produced carbon monoxide can then be converted into synthesis gas (syngas) and other valuable chemicals, while the other reaction products can be used to produce additional economically viable chemicals (e.g., both sulfur dioxide and carbonyl sulfide can be used to produce fertilizers).

B. Description of Related Art

Carbon dioxide is a relatively stable and non-reactive molecule when compared with carbon monoxide. Carbon monoxide is more interesting in this respect, as it can be used to produce several downstream chemical products. For instance, syngas (which includes carbon monoxide and hydrogen gases) is oftentimes used to produce chemicals such as methanol, tert-butyl methyl ether, ammonia, fertilizers, 2-ethyl hexanol, formaldehyde, acetic acid, and 1-4 butane diol.

Syngas can be produced by common methods such as methane steam reforming technology as shown in reaction equation (1), partial oxidation of methane as shown in reaction (2), or dry reforming of methane as shown in reaction (3):

$$CH_4+H_2O \rightarrow CO+3H_2 \quad \Delta H_{298K}=206 \text{ kJ} \qquad (1)$$

$$CH_4+O_2 \rightarrow CO+2H_2 \quad \Delta H_{298K}=-8 \text{ kcal/mol} \qquad (2)$$

$$CH_4+CO_2 \rightarrow 2CO+2H_2 \quad \Delta H_{298K}=247 \text{ kJ} \qquad (3)$$

While the reactions in equations (1) and (2) do not utilize carbon dioxide, equation (3) does. Commercialization attempts of the dry reforming of methane have suffered due to high energy consumption, catalyst deactivation, and applicability of the syngas composition produced in this reaction. Equation (4) illustrates the catalyst deactivation event due to carbonization.

$$CH_4+2CO_2 \rightarrow C+2CO+2H_2O \qquad (4)$$

Other attempts to convert carbon dioxide into carbon monoxide include the catalyst reduction of carbon dioxide using hydrogen as shown in equation (5).

$$CO_2+H_2 \rightarrow CO+H_2O \quad \Delta H=10 \text{ kcal/mol} \qquad (5)$$

This process, which is also known as a reverse water gas shift reaction, is mildly endothermic and takes place at temperatures at about 450° C. However, commercialization of this process suffers from the hydrogen availability. In particular, hydrogen is relatively expensive to produce and isolate. Thus, the present costs and sources of hydrogen are not favorable on a commercial scale to convert $CO_2$ to CO per equation (5).

While other attempts have been made to produce carbon monoxide from carbon dioxide, these attempts have also proven to be inefficient. For instance, U.S. Pat. No. 1,793,677, utilizes carbonaceous fuel (e.g., coal), carbon dioxide, and oxygen to produce a mixture consisting of carbon monoxide together with small quantities of carbon dioxide and sulfurous anhydride. The sulfurous anhydride is a by-product due to the minimal amounts of suphur present in the coal. In particular, carbon dioxide and oxygen are passed over the carbonaceous fuel at temperatures greater than 1000° C. The main source of carbon in this reaction is coal rather than carbon dioxide. Carbon acts as a reducing agent which reduces carbon dioxide and oxygen to carbon monoxide. Also, both oxygen and carbon dioxide acts as oxidizing agents. Therefore, the primary reactants are carbon, oxygen and carbon dioxide, and sulfur is a secondary reactant as its concentration in coal is very low. Sulfur is oxidized to sulfurous anhydride by either oxygen or carbon dioxide. Ultimately, the carbonaceous fuel source as well as the reaction temperatures adds cost and complexities to producing carbon monoxide.

Still further, Asadi et al., in *Nature Communications* 5, 2014, Vol. 5 pp. 4470, describes an electrochemical reduction of carbon dioxide using a molybdenum disulfide as a catalyst at 54 mV in an ionic liquid to produce carbon monoxide and hydrogen. The complexity and additional components needed to drive this reaction also results in an inefficient process that is not commercially viable for producing carbon monoxide.

SUMMARY OF THE INVENTION

A solution to the problems associated with the production of carbon monoxide from carbon dioxide has been discovered. In particular, the solution resides in the ability to reduce carbon dioxide with elemental sulfur gas to produce carbon dioxide and sulfur dioxide as shown in reaction equation (6):

$$2CO_2(g)+S(g) \rightarrow 2CO(g)+SO_2(g) \quad \Delta H=-8 \text{ kJ/mol} \qquad (6)$$

Carbonyl sulfide (COS) can also be produced by this reaction. This reaction can be carried out at relatively low temperatures (e.g., at temperatures at which substantial vapor pressure of S exists, e.g., vapor pressure of S is $5 \times 10^{-4}$ atm at 119° C. and 1 atm at 444.6° C.) and without the assistance of water, oxygen, or hydrogen. Therefore, lower energy requirements are needed to run the reaction, and the costs and complexities associated with introducing water, oxygen, or hydrogen into the reaction can be avoided altogether. Notably, the methods of the present invention can minimize natural gas consumption, can utilize carbon dioxide produced as a byproduct in the production of many petrochemicals, and can economically convert carbon dioxide and elemental sulfur into value added chemical products (e.g., CO, $SO_2$, and COS).

In one particular aspect of the invention, a method of producing carbon monoxide (CO) and sulfur dioxide ($SO_2$) from a reaction mixture comprising carbon dioxide gas ($CO_2(g)$) and elemental sulfur gas (S(g)) is described. The method can include subjecting the reaction mixture to conditions sufficient to produce a product stream comprising CO(g) and $SO_2(g)$. The carbon monoxide can be obtained from reduction of the carbon dioxide by elemental sulfur. The reaction mixture can include a molar ratio of $CO_2(g)$:S(g) of 1:1, 2:1, or 4:1, or 1:1 to 6:1. In some instances, the reaction mixture can consist essentially of or consist of $CO_2(g)$ and S(g). In a particular aspect, the reaction mixture does not include hydrogen gas, oxygen gas, methane gas, and water. In some instances, the product stream comprises $CO(g)$ and $SO_2(g)$ and one or more other products such as carbonyl sulfide ($COS(g)$), carbon disulfide ($CS_2(g)$), $CO_2(g)$, $S(g)$, or any combination thereof. In some aspects of the invention the product stream consists essentially of or consists of $CO(g)$, $SO_2(g)$, $COS(g)$, $CO_2(g)$, and $S(g)$ or $CO(g)$, $SO_2(g)$, $COS(g)$, $CS_2(g)$, $CO_2(g)$, and $S(g)$. In some instances of the present invention, the product stream does not include $CS_2(g)$. Without wishing to be bound by theory, it is believed that carbon disulfide is not produced from the reaction mixture when the molar ratio of $CO_2(g):S(g)$ ranges from 4:1 to 6:1. Process conditions to effect the production of carbon monoxide and sulfur dioxide include a temperature of at least 250° C. or at least 445° C., or from 250° C. to 3000° C., 445° C. to 3000° C., preferably 900° C. to 2000° C., most preferably 1000° C. to 1600° C., a pressure of 1 to 25 bar, and a gas hourly space velocity (GHSV) of 1,000 to 100,000 $h^{-1}$. In some aspects of the invention a catalyst is used to catalyze the reduction of carbon dioxide. The catalyst can be a bulk metal catalyst, a supported catalyst, or both. The catalyst can include a metal, a metal oxide, a lanthanide, a lanthanide oxide, or any combination thereof. Non-limiting examples of the metal or metal oxide includes a Group IIA, IB, IIB, IIIB, IVB, VIB, or VIII metal and/or metal oxide. Non-limiting examples of lanthanides or lanthanide oxide includes La, Ce, Dy, Tm, Yb, Lu, $CeO_2$, $Dy_2O_3$, $Tm_2O_3$, $Yb_2O_3$, $Lu_2O_3$, or $La_2O_3$, or any combination thereof. The catalyst support can include a metal sulfide, a metal carbide, a metal nitride, or a metal phosphate, or any combination thereof. In some aspects of the invention, the catalyst is $MoS_2$ or ZnS. In some aspects of the invention, the method can further include isolating the reaction products from the reaction mixture (such as passing the reaction mixture through a membrane separation system or separating the reaction mixture using condensation process such as cryogenic distillation). The carbon monoxide can be isolated and converted into syngas. The $SO_2(g)$ can be isolated and converted to $SO_3(g)$, and the $SO_3(g)$ can be subsequently converted to sulfuric acid or ammonium sulfate. In some embodiments, the isolated COS can be recycled to the reactor at a temperature of 900° or more. At such temperatures, further production of COS from CO and S is inhibited.

In one aspect of the invention, a system for producing carbon monoxide (CO) and sulfur dioxide ($SO_2$) is described. The system can include an inlet or a first inlet and a second inlet, a reactor, and an outlet in fluid communication. The inlet can be for a feed comprising in a carbon dioxide gas ($CO_2(g)$) and elemental sulfur gas ($S(g)$) or a first inlet for a feed comprising $CO_2(g)$ and a second inlet for a feed comprising $S(g)$. The reactor can include a reaction zone that is configured to be in fluid communication with the inlet, the outlet or both. In some instances, a continuous flow reactor, for example, a plug-flow reactor or a fluidized reactor, can be used. The outlet can be configured to be in fluid communication with the reaction zone to remove a product stream comprising $CO(g)$ and $SO_2(g)$. The reaction zone can include $CO_2(g)$ and $S(g)$ $CO(g)$ and $SO_2(g)$, $COS(g)$, or any combination thereof. In some aspects of the invention, the reaction zone can further include a catalyst capable of catalyzing the conversion of $CO_2(g)$ and elemental sulfur gas $S(g)$ into $CO(g)$ and sulfur dioxide $SO_2(g)$. The system can further include apparatus capable of separating the individual products from the product mixture. Non-limiting examples of separation apparatuses includes a condenser apparatus capable of condensing the produced $SO_2(g)$ to $SO_2(l)$ and separating the $SO_2(l)$ from the produced $CO(g)$ and $COS(g)$, a membrane apparatus capable of separating $CO(g)$ from $COS(g)$, and a scrubber apparatus capable of separating $CO(g)$ from trace amounts of $COS(g)$ and $SO_2(g)$. The condenser apparatus can be downstream from the reactor, the membrane apparatus can be downstream from the condenser apparatus, and the scrubber apparatus can be downstream from the membrane apparatus. Other non-limiting examples of separation apparatuses include a condenser apparatus capable of condensing the produced $SO_2(g)$ to $SO_2(l)$ and separating the $SO_2(l)$ from the produced $CO(g)$ and $COS(g)$, and a cryogenic distillation apparatus capable of condensing the $COS(g)$ to $COS(l)$, and separating the $COS(l)$ from the $CO(g)$, and a scrubber apparatus capable of separating $CO(g)$ from trace amounts of $COS(g)$ and $SO_2(g)$. The condenser apparatus can be downstream from the reactor, and the cryogenic distillation apparatus is downstream from the condenser apparatus, and the scrubber apparatus is downstream from the cryogenic distillation apparatus. The system can include an outlet in fluid communication with a COS/CO separation system (e.g., the membrane system) and configured to produce COS from a COS/CO stream. The system can also include a COS inlet in fluid communication with the outlet of the separation system and the reactor.

In yet another embodiment there is disclosed a reaction mixture comprising carbon dioxide gas ($CO_2(g)$) and elemental sulfur gas ($S(g)$). The reaction mixture can consist essentially of or consist of $CO_2(g)$ and $S(g)$. The molar ratio of $CO_2(g)$ to $S(g)$ can be 1:1 to 6:1, 2:1 to 6:1, 3:1 to 6:1, or 4:1 to 6:1. The molar ratio of $CO_2(g)$ to $S(g)$ can be 1:1. The molar ratio of $CO_2(g)$ to $S(g)$ can be 2:1. The molar ratio of $CO_2(g)$ to $S(g)$ can be 4:1. The molar ratio of $CO_2(g)$ to $S(g)$ can be 6:1. In certain instances, hydrogen gas, oxygen gas, methane gas, or water, or any combination thereof, or all thereof, are not present in the reaction mixture.

Also disclosed is a product stream comprising carbon monoxide gas $CO(g)$ and sulfur dioxide gas $SO_2(g)$. The product stream can further include carbonyl sulfide gas ($COS(g)$) or carbon disulfide gas ($CS_2(g)$) or both. The product stream can further include carbon dioxide gas ($CO_2(g)$) and elemental sulfur gas ($S(g)$). The product stream can consist essentially of or consist of $CO(g)$, $SO_2(g)$, $COS(g)$, $CO_2(g)$, and $S(g)$. The product stream can consist essentially of or consist of $CO(g)$, $SO_2(g)$, $COS(g)$, $CS_2(g)$, $CO_2(g)$, and $S(g)$. In certain instances, the product stream does not include $CS_2(g)$.

In the context of the present invention 65 embodiments are described. In a first embodiment, a method of producing carbon monoxide (CO) and sulfur dioxide ($SO_2$) is described. The method can include (a) obtaining a reaction mixture comprising carbon dioxide gas ($CO_2(g)$) and elemental sulfur gas ($S(g)$); and subjecting the reaction mixture to conditions sufficient to produce a product stream comprising $CO(g)$ and $SO_2(g)$. Embodiment 2 is the method of embodiment 1, wherein the product stream further comprises carbonyl sulfide ($COS(g)$). Embodiment 3 is the method of embodiment 2, wherein the product stream further comprises carbon disulfide ($CS_2(g)$). Embodiment 4 is the method of any one of embodiments 1 to 3, wherein the product stream further comprises $CO_2(g)$ and $S(g)$. Embodiment 5 is the method of embodiments 4, wherein the product stream consists essentially of or consists of $CO(g)$, $SO_2(g)$, $COS(g)$, $CO_2(g)$, and $S(g)$ or $CO(g)$, $SO_2(g)$, $COS(g)$, $CS_2(g)$, $CO_2(g)$, and $S(g)$. Embodiment 6 is the method of any one of embodiments 1 to 5, wherein the reaction mixture comprises a $CO_2(g):S(g)$ molar ratio of 1:1 to 6:1. Embodiment 7 is the method of embodiment 6, wherein the reaction mixture comprises a $CO_2(g)$:$S(g)$ molar ratio of 1:1. Embodiment 8 is the method of embodiment 6, wherein the reaction mixture comprises a $CO_2(g)$:$S(g)$ molar ratio of 2:1. Embodiment 9 is the method of embodiment 6, wherein the reaction mixture comprises a $CO_2(g)$:$S(g)$ molar ratio of 4:1. Embodiment 10 is the method of embodiment 9, wherein the product stream does not include $CS_2(g)$. Embodiment 11 is the method of embodiment 6, wherein the reaction mixture comprises a $CO_2(g)$:$S(g)$ molar ratio of 6:1. Embodiment 12 is the method of embodiment 11, wherein the product stream does not include $CS_2(g)$. Embodiment 13 is the method of any one of embodiments 1 to 12, wherein the reaction temperature in step (b) is at least 445° C. Embodiment 14 is the method of claim 13, wherein the reaction temperature in step (b) is 250° C. to 3000° C., preferably 900° C. to 2000° C., most preferably 1000° C. to 1600° C. Embodiment 15 is the method of any one of embodiments 1 to 14, wherein the reaction pressure is 1 to 25 bar. Embodiment 16 is the method of any one of embodiments 1 to 15, wherein a gas hourly space velocity (GHSV) of 1,000 to 100,000 $h^{-1}$ is used. Embodiment 17 is the method of any one of embodiments 1 to 16, further comprising contacting the reaction mixture in step (b) with a catalyst. Embodiment 18 is the method of embodiment 17, wherein the catalyst comprises a metal, a metal oxide, a metal sulfide, a lanthanide, a lanthanide oxide, or any combination thereof. Embodiment 19 is the method of embodiment 18, wherein the metal, metal oxide, or metal sulfide includes a Group IIA, IB, IIB, IIIB, IVB, VIB, or VIII metal. Embodiment 20 is the method of embodiment 19, wherein the metal sulfide comprises molybdenum or zinc. Embodiment 21 is the method of embodiment 21, wherein the lanthanide, or lanthanide oxide includes La, Ce, Dy, Tm, Yb, Lu, $CeO_2$, $Dy_2O_3$, $Tm_2O_3$, $Yb_2O_3$, $Lu_2O_3$, or $La_2O_3$, or any combination thereof. Embodiment 22 is the method of any one of embodiments 17 to 21, wherein the catalyst is a bulk metal catalyst. Embodiment 23 is the method of any one of embodiments 17 to 22, wherein the catalyst is a supported catalyst. Embodiment 24 is the method of embodiment 23, wherein the support comprises a metal sulfide, a metal carbide, a metal nitride, or a metal phosphate, and any combination thereof. Embodiment 25 is the method of any one of embodiments 1 to 24, wherein hydrogen gas, oxygen gas, methane gas, and water are not included in the reaction mixture. Embodiment 26 is the method of any one of embodiments 1 to 25, wherein the produced CO(g) is isolated and converted into syngas. Embodiment 27 is the method of any one of embodiments 1 to 26, wherein the produced $SO_2(g)$ is isolated and converted to $SO_3(g)$, and the $SO_3(g)$ is subsequently converted to sulfuric acid. Embodiment 28 is the method of any one of embodiments 1 to 27, wherein the product stream comprises CO(g), $SO_2(g)$ and COS(g), and one or more of the products are isolated by a condensation process. Embodiment 29 is the method of embodiment 28, wherein the isolated product comprises $SO_2(g)$. Embodiment 30 is the method of any one of embodiments 1 to 29, wherein the product stream comprises CO(g), $SO_2(g)$ and COS(g), and one or more of the products are isolated by a membrane separation process. Embodiment 31 is the method of embodiment 30, wherein the isolated product comprises COS(g), CO(g), or both. Embodiment 32 is the method of any one of embodiments 1 to 31, wherein the product stream comprises CO(g), $SO_2(g)$ and COS(g), and one or more of the products are isolated by a liquid scrubbing process. Embodiment 33 is the method of embodiment 32, wherein the isolated product comprises CO(g). Embodiment 34 is the method of any one of embodiments 1 to 27, wherein the product stream comprises CO(g), $SO_2(g)$ and COS(g), and one or more products is isolated by a cryogenic distillation process. Embodiment 35 is the method of embodiment 34, wherein the isolated products comprise COS(g), CO(g) or both. Embodiment 36 is the method of any one of embodiments 1 to 27, wherein the product stream comprises CO(g), $SO_2(g)$ and COS(g), and one or more components are isolated using one or more processes from embodiments 28-34. Embodiment 37 is the method of any one of embodiments 1 to 27, wherein the product stream comprises CO(g), $SO_2(g)$ and COS(g), and the COS (g) is recycled to step (b) at a reaction temperature of 900° C. or more. Embodiment 38 is the method of embodiment 37, wherein recycling the COS (g) inhibits formation of additional COS (g). Embodiment 39 is the method of any one of embodiments 1 to 38, wherein the reaction in step (b) is an exothermic reaction.

Embodiment 40 describes a system for producing carbon monoxide (CO) and sulfur dioxide ($SO_2$). The system can include an inlet for a feed that can include a carbon dioxide gas ($CO_2(g)$) and elemental sulfur gas (S(g)) or a first inlet for a feed that can include $CO_2(g)$ and a second inlet for a feed comprising S(g); and a reactor that includes a reaction zone that is configured to be in fluid communication with the inlet or inlets, wherein the reaction zone comprises $CO_2(g)$ and S(g); and an outlet configured to be in fluid communication with the reaction zone to remove a product stream comprising CO(g) and $SO_2(g)$. Embodiment 41 is the system of embodiment 40, wherein the reaction zone further comprises CO(g) and $SO_2(g)$. Embodiment 42 is the system of embodiment 41, wherein the reaction zone further comprises COS(g). Embodiment 43 is the system of any one of embodiments 40 to 42, further comprising a collection device that is capable of collecting the product stream. Embodiment 44 is the system of any one of embodiments 40 to 43, wherein the reaction zone can further include a catalyst capable of catalyzing the conversion of $CO_2(g)$ and elemental sulfur gas S(g) into CO(g) and sulfur dioxide $SO_2(g)$. Embodiment 45 is the system of any one of embodiments 40 to 44, wherein the reactor is a plug-flow reactor or a fluidized reactor. Embodiment 46 is the system of any one of embodiments 40 to 45, further comprising a condenser apparatus capable of condensing the produced $SO_2(g)$ to $SO_2(l)$ and separating the $SO_2(l)$ from the produced CO(g) and COS(g), a membrane apparatus capable of separating CO(g) from COS(g), and a scrubber apparatus capable of separating CO(g) from trace amounts of COS(g) and $SO_2$ (g). Embodiment 47 is the system of embodiment 46, configured such that the condenser apparatus is downstream from the reactor, the membrane apparatus is downstream from the condenser apparatus, and the scrubber apparatus is downstream from the membrane apparatus. Embodiment 48 is the system of any one of embodiments 40 to 45, further comprising a condenser apparatus capable of condensing the produced $SO_2(g)$ to $SO_2(l)$ and separating the $SO_2(l)$ from the produced CO(g) and COS(g), and a cryogenic distillation apparatus capable of condensing the COS(g) to COS(l), and separating the COS(l) from the CO(g), and a scrubber apparatus capable of separating CO(g) from trace amounts of COS(g) and $SO_2(g)$. Embodiment 49 is the system of embodiment 45, configured such that the condenser apparatus is downstream from the reactor, and the cryogenic distillation apparatus is downstream from the condenser apparatus, and the scrubber apparatus is downstream from the cryogenic distillation apparatus. Embodiment 50 is the system of any one of embodiments 46 to 49, further comprising: (i) an outlet configured to be in fluid communication with the membrane to remove COS from the membrane; and (ii) an inlet for the COS configured to be in fluid communication with the membrane outlet and the reactor.

Embodiment 51 is a reaction mixture that can include carbon dioxide gas ($CO_2(g)$) and elemental sulfur gas ($S(g)$). Embodiment 52 is the reaction mixture of embodiment 51, consisting essentially of or consisting of $CO_2(g)$ and $S(g)$. Embodiment 53 is the reaction mixture of any one of embodiments 51 to 52, wherein the molar ratio of $CO_2(g)$ to $S(g)$ is 1:1 to 6:1. Embodiment 54 is the reaction mixture of embodiment 51, wherein the molar ratio of $CO_2(g)$ to $S(g)$ is 1:1. Embodiment 55 is the reaction mixture of embodiment 51, wherein the molar ratio of $CO_2(g)$ to $S(g)$ is 2:1. Embodiment 56 is the reaction mixture of embodiment 51, wherein the molar ratio of $CO_2(g)$ to $S(g)$ is 4:1. Embodiment 57 is the reaction mixture of embodiment 51, wherein the molar ratio of $CO_2(g)$ to $S(g)$ is 6:1. Embodiment 58 is the reaction mixture of any one of embodiments 51 to 57, wherein hydrogen gas, oxygen gas, methane gas, and water are not included in the reaction mixture.

Embodiment 59 is a product stream that includes carbon monoxide gas $CO(g)$ and sulfur dioxide gas $SO_2(g)$. Embodiment 60 is the product stream of embodiment 59, further including carbonyl sulfide gas ($COS(g)$). Embodiment 61 is the product stream of embodiment 60, further including carbon disulfide gas ($CS_2(g)$). Embodiment 62 is the product stream of any one of embodiments 59 to 61, further comprising carbon dioxide gas ($CO_2(g)$) and elemental sulfur gas ($S(g)$). Embodiment 63 is the product stream of embodiment 62, consisting essentially of or consisting of $CO(g)$, $SO_2(g)$, $COS(g)$, $CO_2(g)$, and $S(g)$. Embodiment 64 is the product stream of embodiment 63, consisting essentially of or consisting of or $CO(g)$, $SO_2(g)$, $COS(g)$, $CS_2(g)$, $CO_2(g)$, and $S(g)$. Embodiment 65 is the product stream of any one of embodiments 59 to 64, wherein the product stream does not include $CS_2(g)$.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "bulk metal oxide catalyst" as that term is used in the specification and/or claims, means that the catalyst includes one or more metals, or metal oxides/metal sulfides or metal nitrides and does not require a carrier or an inert support.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the methods of the present invention are their abilities to produce carbon monoxide and sulfur dioxide.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

Figure 1:
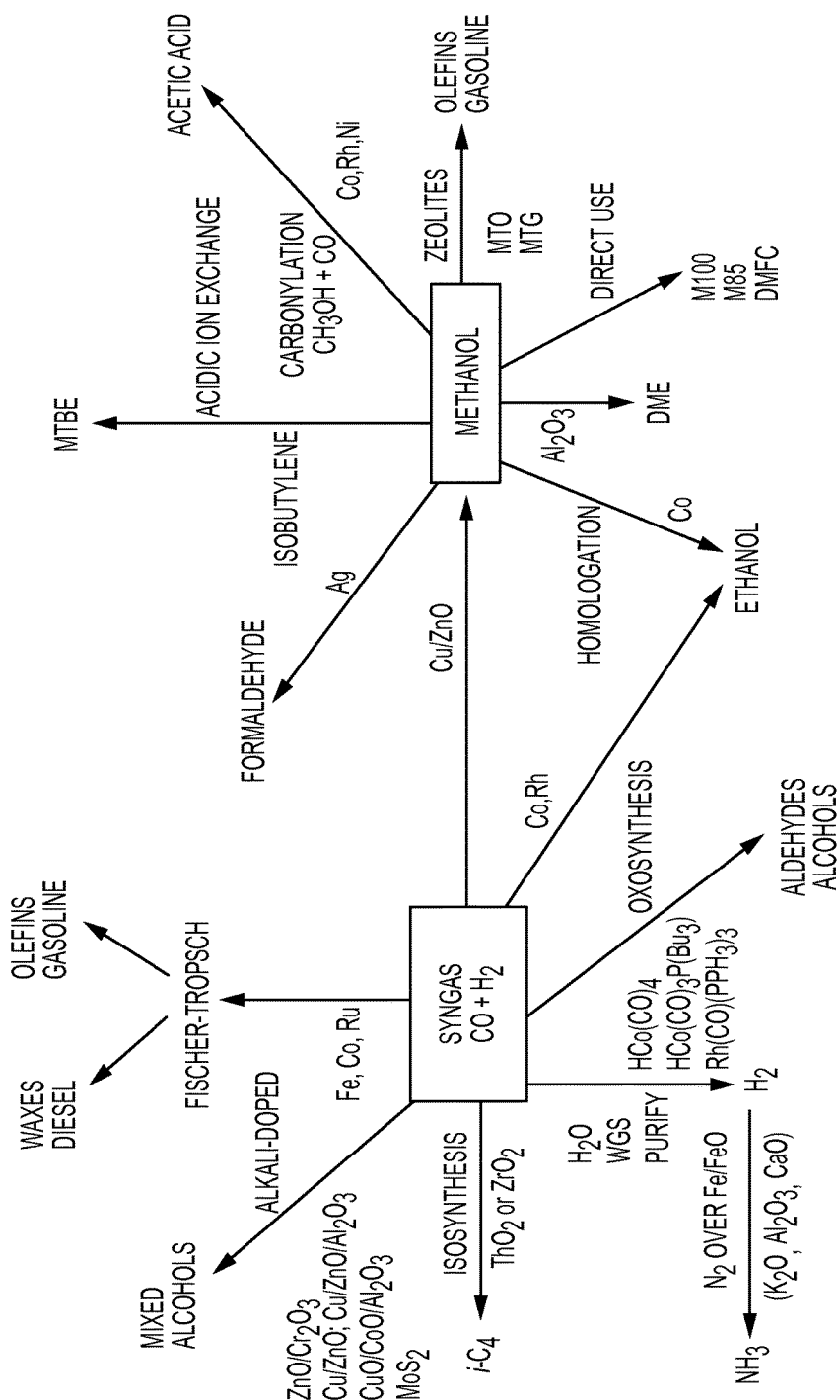
FIG. 1 is an illustration of various products that can be produced from syngas.

The present invention provides a solution to the current problems associated with converting carbon dioxide to carbon monoxide. The solution resides in reacting gaseous sulfur with carbon dioxide to produce carbon monoxide and sulfur dioxide, which is represented by equation (6) shown above. The reaction can be tuned via the reaction temperature and amounts of reactants used to obtain a particular product stream profile. For instance, other reaction products that can be produced during the reaction include COS(g), S(g), and CS(g). Each of the reaction products can be further processed into desired chemicals. By way of example, the produced carbon monoxide can be converted to syngas by converting part of the carbon monoxide to into hydrogen gas by the water gas shift reaction (see equation (5)). Syngas can be used in a variety of processes to produce desired chemicals, examples of which are provided in FIG. 1. The produced SO$_2$ can be converted into SO$_3$ and then sulfuric acid and ultimately ammonium sulfate fertilizers. Similarly, COS (g) and S(g) can be converted into valuable commercial products or used as reactants to produce more carbon monoxide. These and other non-limiting aspects of the present invention are discussed in further detail in the following sections.

A. Reaction Feed

The reactant mixture or feed in the context of the present invention can include a gaseous mixture that includes, but is not limited to, sulfur gas (S(g)), and carbon dioxide gas (CO$_2$(g)). Alternatively, the S(g) and CO$_2$(g) feeds can be introduced separately and mixed in a reactor. Sulfur gas (S(g)) in the context of the present invention can be referred to as elemental sulfur and can include, but is not limited to, all allotropes of sulfur (i.e., S$_n$ where n=1 to ∞). Non-limiting examples of sulfur allotropes include S, S$_2$, S$_4$, S$_6$, and S$_8$, with the most common allotrope being S$_8$. Sulfur gas can be obtained by heating solid or liquid sulfur to their boiling points of about 445° C. Solid sulfur can contain either (a) sulfur rings, which may have 6, 8, 10 or 12 sulfur atoms, with the most common form being S$_8$, or (b) chains of sulfur atoms, referred to as catenasulfur having the formula S$_∞$. Liquid sulfur is typically made up of S$_8$ molecules and other cyclic molecules containing a range of six to twenty atoms. Solid sulfur is generally produced by extraction from the earth using the Frasch process, or the Claus process. The Frasch process extracts sulfur from underground deposits. The Claus process produces sulfur through the oxidation of hydrogen sulfide (H$_2$S). Hydrogen sulfide can be obtained from waste or recycle stream (for example, from a plant on the same site, or as a product from hydrodesulfurization of petroleum products) or recovery the hydrogen sulfide from a gas stream (for example, separation for a gas stream produced during production of petroleum oil, natural gas, or both). A benefit of using sulfur as a starting material is that it is abundant and relatively inexpensive to obtain as compared to hydrogen gas.

Carbon dioxide used in the present invention can be obtained from various sources. In one non-limiting instance, the carbon dioxide can be obtained from a waste or recycle gas stream (e.g. from a plant on the same site, like for example from ammonia synthesis) or after recovering the carbon dioxide from a gas stream. A benefit of recycling such carbon dioxide as a starting material in the process of the invention is that it can reduce the amount of carbon dioxide emitted to the atmosphere (e.g., from a chemical production site).

The reactant mixture may further contain other gases, provided that these do not negatively affect the reaction. Examples of such other gases include nitrogen or argon. In some aspects of the invention, the reactant gas stream is substantially devoid of other reactant gas such as hydrocarbon gases, oxygen gas, hydrogen gas, water or any combination thereof. Hydrocarbon gases include, but are not limited to, C$_1$ to C$_5$ hydrocarbon gases, such as methane, ethylene, ethane, propane, propylene, butane, butylene, isobutene, pentane and pentene. In a particular aspect of the invention the gaseous feed contains 0.1 wt. % or less, or 0.0001 wt. % to 0.1 wt. % of combined other reactant gas. In the reactant mixture, a molar ratio of CO$_2$(g) to S(g) can range from 1:1 to 6:1 and any range therein. Ratios lower than 1:1 and higher than 6:1 are also contemplated in the context of the present invention. Ultimately, the ratio can be varied to produce a desired reaction product profile.

B. Reaction Products

The products made from the reduction of carbon dioxide with sulfur in the gas phase can be varied by adjusting the molar ratio of CO$_2$(g) to S(g), the reaction conditions, or both. The major products produced from the reaction of carbon dioxide and sulfur is carbon monoxide and sulfur dioxide as shown in reaction equation (6). The other products that can be produced by the reaction include CS$_2$ and COS as shown in equation (7), with 10% or less of the reaction product being CS$_2$ at any ratio of CO$_2$ to S. In some aspects of the invention, the distribution of products in the product stream (for example, COS(g), SO$_2$, CS$_2$, CO$_2$, CO and SO$_2$) can be controlled by adjusting the ratio of carbon dioxide to sulfur from 1:1 to 2:1 and up to 6:1 and the temperature of the reaction.

$$CO_2(g)+S(g) \rightarrow COS(g)+SO_2(g)+CS_2(g)+CO(g) \quad (7)$$

1. COS Formation

Without wishing to be bound by theory, it is believed that, as shown in equation (8), carbon dioxide initially reacts with sulfur to form carbonyl sulfide and oxygen. In some aspect of the invention, the amount of COS(g) produced can be adjusted by varying the temperature of the reaction. At a temperature 400 and 700° C., the product stream contains COS and SO$_2$ with a minimal amount of CO. At these temperatures, the ratio of COS:SO$_2$ can be 2:1 or 1:1. In some aspects of the invention, the COS can be separated from the SO$_2$ and CO$_2$ as described throughout this Specification and sold or further processed into other chemical products.

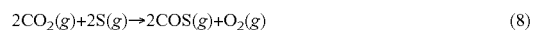

$$2CO_2(g)+2S(g) \rightarrow 2COS(g)+O_2(g) \quad (8)$$

2. CO and SO$_2$ Formation

Without wishing to be bound by theory, it is believed that the carbonyl sulfide and oxygen in equation (8) react with carbon dioxide and sulfur to form SO$_2$ and CO as shown in equations (9) and (10). In some aspects of the invention, CO and SO$_2$ are produced at temperatures between 700 and 3000° C., 900 to 2000° C., or 1500 to 1700° C., with a preferred temperature of between 1000 and 1600° C. and CO$_2$ to S ratios of 1:1 to 2:1, and up to 6:1. In other instances, however, lower temperatures are also contemplated (e.g., 250° C. or more or certain temperature and pressure conditions can be used to ensure sulfur is in the gaseous phase—e.g., conditions at which substantial vapor pressure of S exists, e.g., vapor pressure of S is 5×10$^{-4}$ atm at 119° C. and 1 atm at 444.6° C.). The ratio of CO(g) to SO2(g) in the product mixture can range from 0.1:1, 1:2, 1:1, 2:1. The temperature of the reaction and/or $CO_2$/S ratio can be adjusted to produce a desired $CO/SO_2$ ratio. For example, if a high $CO/SO_2$ is desired, a temperature of 1200° C. can be used instead of 1500° C. On the other hand, if a high CO/COS ratio is desired, a $CO_2$/S ratio of 6:1 and temperature of 1500° C. or 1200° C. can be used. The of equilibrium ratios of CO(g) to SO2(g) at 918° C., 1120° C. and 1500° C. and different temperatures are summarized in Table 1.

$$S(g) + O_2(g) \rightarrow SO_2(g) \quad (9)$$

$$COS(g) + 2CO_2(g) \rightarrow SO_2(g) + 3CO(g) \quad (10)$$

TABLE 1

| $CO_2$:S ratio | $CO:SO_2$ ratio at 918° C. | $CO:SO_2$ ratio at 1120° C. | $CO:SO_2$ ratio at 1500° C. |
|---|---|---|---|
| 6:1 | 0.8:1 | 1.78:1 | 2:1 |
| 4:1 | 0.55:1 | 1.55:1 | 1.9:1 |
| 2:1 | 0.3:1 | 1.1:1 | 1.6:1 |
| 1:1 | 0.1:1 | 0.9:1 | 0.5:1 |

A ratio of CO/COS at about 900° C. is about 120:1 with a starting $CO_2$ to S ratio of 6:1. Equilibrium ratio of $CO_2$ to the combined CO and $SO_2$ is summarized in Table 2.

TABLE 2

| $CO_2$:S ratio | $CO_2/(CO + SO_2)$ ratio at 918° C. | $CO_2/(CO + SO_2)$ ratio at 1120° C. | $CO_2/(CO + SO_2)$ ratio at 1500° C. |
|---|---|---|---|
| 6:1 | 6.2:1 | 2:1 | 1.2:1 |
| 4:1 | 4.9:1 | 1.5:1 | 0.8:1 |
| 2:1 | 2.8:1 | 0.8:1 | 0.3:1 |
| 1:1 | 1:1 | 0.1:1 | 0.5:1 |

Without wishing to be bound by theory, it is believed that at temperatures above 1500° C., additional CO(g) is formed through the decomposition of any remaining COS to CO(g) and S(g) as shown in equation (11). In embodiments when the $CO_2$ to S ratio is greater than 2:1, the COS(g) decomposition can be suppressed.

$$COS(g) \rightarrow CO(g) + S(g) \quad (11)$$

3. $CS_2$ Formation

In certain aspects of the invention when the ratio of $CO_2$ to S is 1:1 or 2:1, and the temperature of the reaction is from about 445 to about 700° C., the amount of $CS_2$ formed as shown in equation (12). The amount of carbon disulfide produced can be about 10% or less on a molar basis. The oxygen produced can react with sulfur to form sulfur dioxide.

$$CO_2(g) + 2S(g) \rightarrow CS_2(g) + O_2(g) \quad (12)$$

In some aspects of the invention, to inhibit or reduce the amount of carbon disulfide formation, the amount of $CO_2$ can be increased in the reaction mixture. Without wishing to be bound by theory, it is believed that the increased $CO_2$ reacts with the $CS_2$ to give CO and $SO_2$ at higher concentrations of $CO_2$. In some aspects of the invention, at a $CO_2$:S ratio of 4:1, no, or undetectable amounts of, $CS_2$ is formed at temperatures between 400 to 3000° C. It is believed that at temperatures greater than 1000° C., any carbon disulfide that is generated decomposes to carbon monosulfide CS(g) and S(g). The generated sulfur can react with excess carbon dioxide to continue production of COS, CO and $SO_2$.

Without wishing to be bound by theory, it is believed that the carbon monosulfide can polymerize at reaction temperatures above 1000° C.

C. Process

The reaction of carbon dioxide and sulfur can be performed at conditions to produce a product stream that includes carbonyl sulfide, carbon monoxide and sulfur dioxide. Non-limiting examples of process for the reduction of carbon dioxide to carbon monoxide in the presence of sulfur are illustrated with reference to the Figures.

1. Reactor Systems

Figure 2:
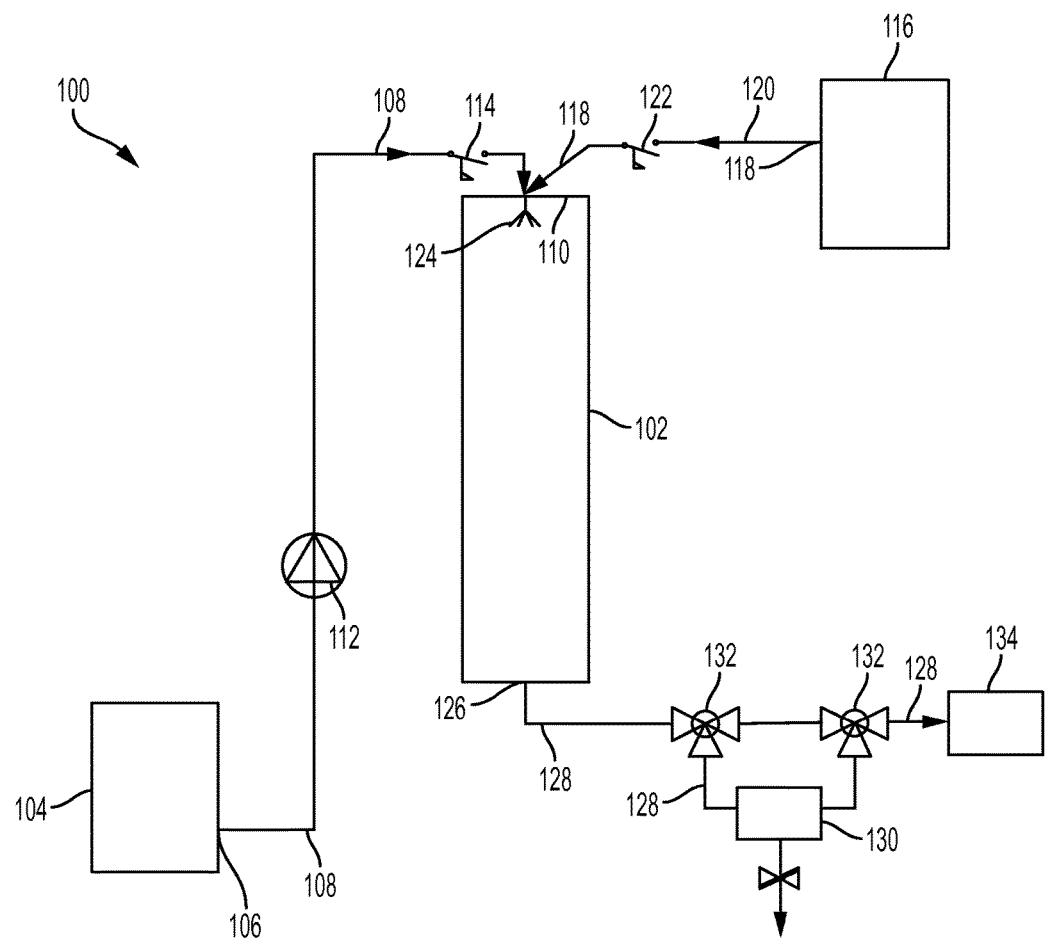
FIG. 2 is a schematic of a plug-flow reactor system of the present invention.
Figure 3:
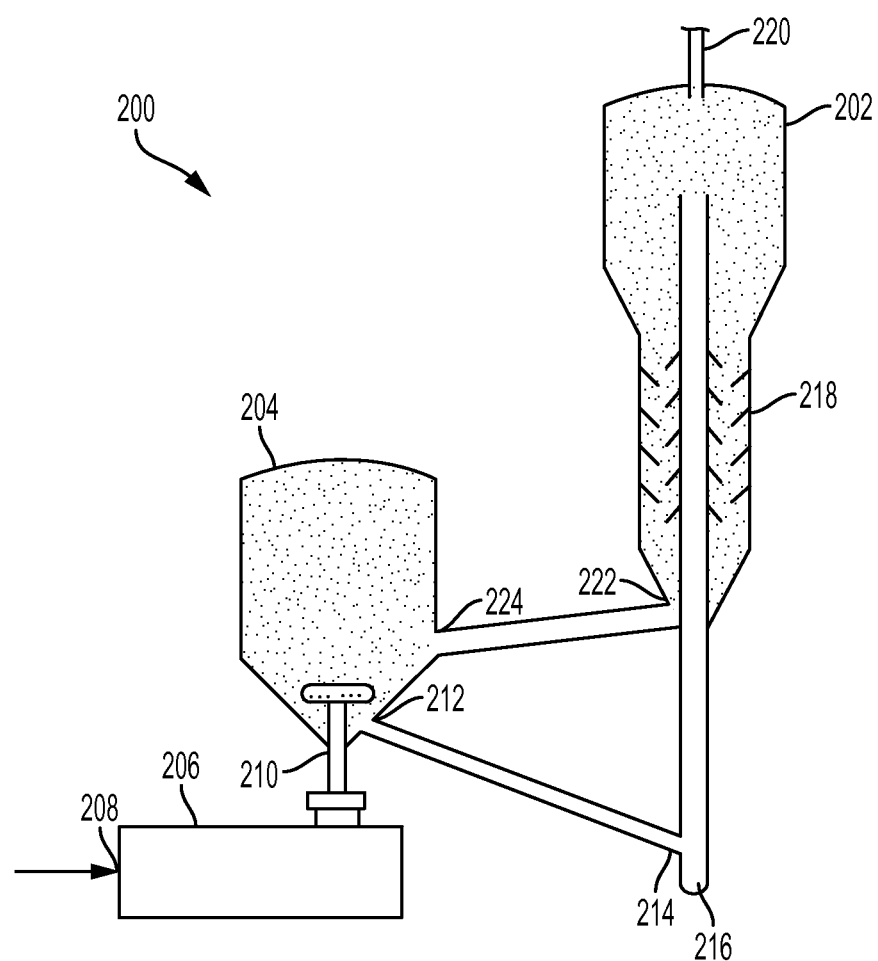
FIG. 3 is a schematic of fluidized bed reactor system of the present invention.

FIGS. 2 and 3 are schematics of reactor systems 100 and 200 of the present invention. The reactors used for the present invention can be fixed-bed reactors, stacked bed reactors, fluidized bed reactors, slurry or ebullating bed reactors, spray reactors, or plug flow reactor. The reactors can be manufactured from material resistant to corrosion from sulfur and/or carbon dioxide. A non-limiting example of such material is stainless steel. In FIG. 2 a plug flow type reactor 102 is depicted and in FIG. 3, a fluidized bed reactor 202 is depicted. Referring to FIG. 2, sulfur is provided to storage vessel 104 as molten sulfur. In some aspects, solid sulfur is heated in storage vessel 104 to about 250° C. to liquefy the molten sulfur. Storage vessel may be to 250 to 300° C. to maintain the sulfur in a liquid phase. Molten sulfur can exit storage vessel 104 through outlet 106, and be pumped through conduit 108 to reaction vessel inlet 110 at the top of the reactor 102 using pump 112. The outlet 106, the conduit 108, and the reaction vessel inlet 110 can be heated to 250 to 300° C. to inhibit solidification of the molten sulfur in the outlet, conduit, or inlet. Flow of the molten sulfur into reaction vessel inlet 110 can be altered using flow switch 114. As shown in FIG. 2, the flow switch 114 is in a disabled or unconnected position which inhibits the molten sulfur from flowing into reaction vessel inlet 110. When flow switch 114 is engaged or connected, the molten sulfur flows from conduit 108 to reaction vessel inlet 110. Reaction gases can be stored in a gas storage unit 116. Reaction gas (for example, carbon dioxide or a mixture of carbon dioxide or carbonyl sulfide can exit the gas storage unit 116 through a gas outlet 118, flow through a gas conduit 120, and enter the reaction vessel inlet 110. The gas conduit 120 may include a flow switch 122. As shown in FIG. 2, the flow switch 122 is in a disabled or unconnected position which inhibits the reaction gases from flowing into reaction vessel inlet 110. When the flow switch 122 is engaged or connected, the reaction gases flow from the conduit 108 to the reaction vessel inlet 110. The reaction vessel inlet 110 can couple to a nozzle 124 positioned inside the reactor 104. The nozzle 124 can be any known nozzle suitable for providing an aerosol or mist to the inside of the reactor 104. The reaction vessel inlet 110 and the spray nozzle 124 can be heated to 250 to 400° C. As the molten sulfur and reaction gas enter the spray nozzle 114, the compounds are mixed and sprayed as an aerosol into a reaction zone of the reactor 104. Reactor 104 can be heated to above the boiling point of sulfur, for example above 415° C. As the aerosol mixture of sulfur and reaction gas enters the reactor 104, the sulfur vaporizes or transforms into a gas phase. The gaseous sulfur and reaction gases react in the reaction zone of reactor 104 to form the reaction products described throughout the Specification. For example, gaseous sulfur reacts with carbon dioxide in the reaction zone to form a gaseous mixture. The gaseous mixture can include CO(g), $SO_2$(g), COS(g), or any combination thereof. In some instances, gaseous sulfur is also in the produced gaseous mixture. As shown, the reactor 102 does not include a catalyst. In some aspects of the invention, the reactor 102 may include one or more catalysts throughout the Specification positioned in the reaction zone described. The gaseous mixture can flow through the reactor 102 and contacts the catalyst in the reaction zone. Such contact can produce the gaseous mixture.

The gaseous mixture can exit the reactor 104 through reactor outlet 126 through gas conduit 128 to condenser 130. Conduit 128 can include one or more valve 132. Valves 132 may be capable to route a portion of the gaseous mixture to analyzer 134. For example, valves 132 may be three-way valves. Analyzer may be any suitable instrument capable of analyzing a gaseous mixture. A non-limiting example of an analyzer is a gas chromatograph in combination with a mass spectrometer (GC/MS). The condenser 130 may cool the gaseous mixture to a temperature suitable to condense sulfur dioxide, gaseous sulfur, if present, or both from the gaseous mixture. Condenser 130 may be part of a recovery unit that separates the components of the gaseous mixture. Such a recovery unit is described in more detail in the following sections.

Referring to FIG. 3, a schematic of fluidized bed reactor system 200 is depicted. The system 200 includes reactor 202, catalyst treatment unit 204, and sublimation unit 206. In the reactor system 200, solid sulfur may be provided to a sublimation unit 206 through sublimation inlet 208. In sublimation unit 206, the sulfur is heated to about 100° C. to allow the sulfur to sublime into catalyst treatment unit 204 through sublimator 210. In the catalyst treatment unit 204, the sublimated sulfur contacts the catalyst and adsorbs onto the catalysts. Contact of the sulfur with the metals in the catalysts activates the metals in the catalyst. The activated catalyst exits the catalyst treatment unit 204 through catalyst treatment unit outlet 212 of the reactor 202 through reactor catalyst inlet 214. Reactant gas (carbon dioxide) enters reactor 202 through reactor gas inlet 216 under pressure. The pressure of the reaction gas is sufficient to move the catalysts in an upwardly direction in the reactor 202 and mix the catalyst with the reaction gas. As the mixture of reaction gas and catalysts enters a reaction zone 218, the sulfur reacts with the reactant gas to form a gaseous product mixture that includes $CO_2$, $SO_2$, COS, or combinations thereof. The reaction zone 218 can be heated to 500 to 1500° C., which can accelerate the reaction between the absorb sulfur and the reaction case. The gaseous mixture can exit the reactor 202 through reactor gas outlet 220 and be transported to one or more recovery systems. Spent catalyst may exit the reactor 202 through reactor catalyst outlet 222 and enter catalyst treatment unit 204 through catalyst treatment inlet 224. In catalyst treatment unit 204, the catalyst is contacted with fresh sublimated sulfur and the cycle is repeated.

2. Product Recovery Systems

Figure 4:
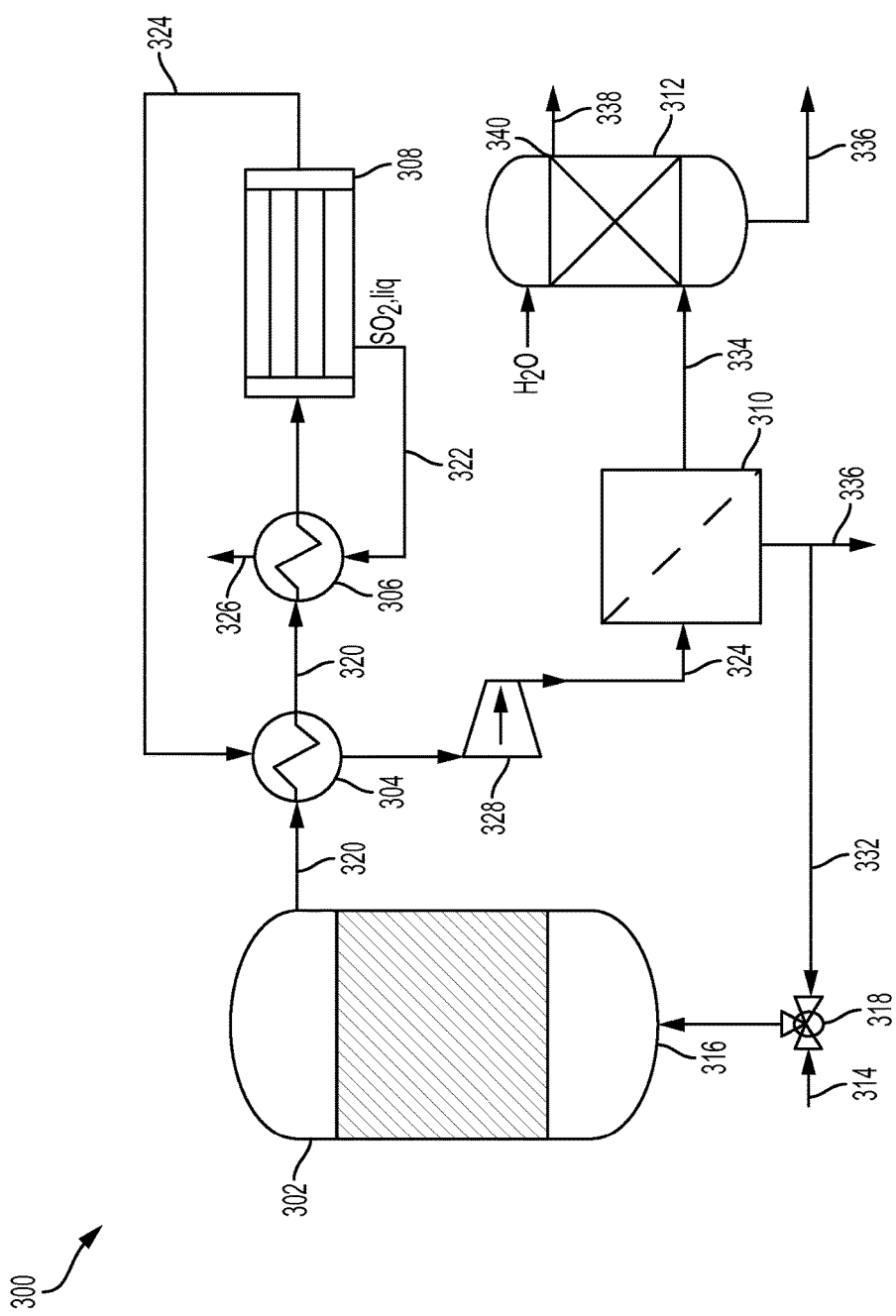
FIG. 4 is a schematic of a membrane separation system of the present invention.
Figure 5:
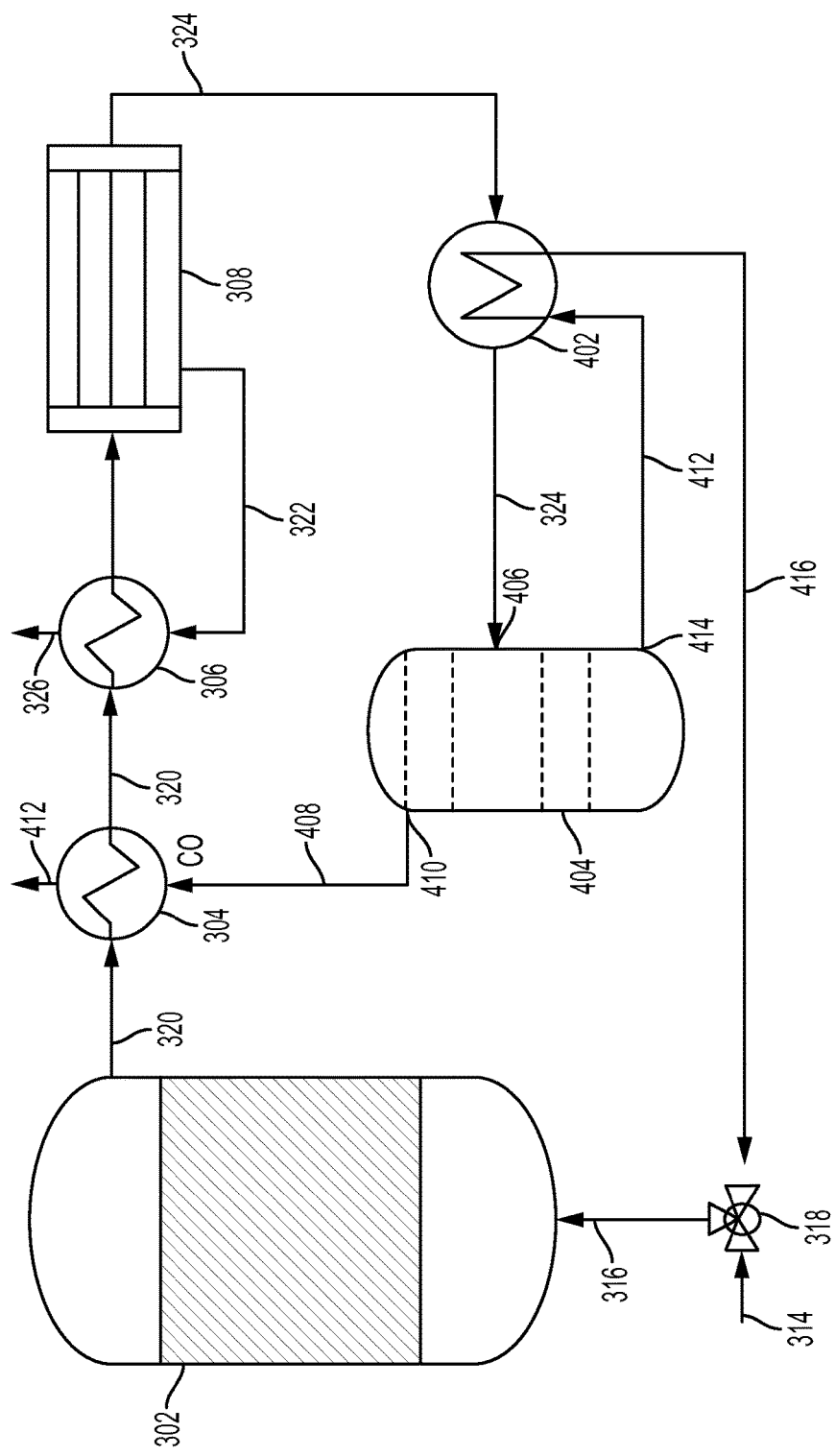
FIG. 5 is a schematic of a cryogenic distillation system of the present invention.

In some aspects of the process, the components of the gaseous product mixture can be separated into sulfur, sulfur dioxide, carbonyl sulfide, carbon monoxide or combinations thereof using known separation technology methods. In some embodiments, thermal-based separation systems (e.g. condensation, distillation) can be used to remove each component and produce a pure stream of CO. Other forms of separation, such as chemi- and physi-sorption systems can also be used to remove particular components. For example, carbon dioxide ($CO_2$) can be removed using amine based chemi-sorption. Carbonyl sulfide (COS) can be removed using an aqueous treatment system. In some embodiments, the products can be separated using a membrane system or a cryogenic distillation system. FIGS. 4 and 5 are schematics of non-limiting examples of recovery or separation systems. FIG. 4 is a schematic of a membrane separation system. FIG. 5 is a schematic of a cryogenic distillation system. As shown, in FIGS. 4 and 5 the flow of gas is upwardly through the reactor, however, it should be understood that a linear flow reactor or a reactor with downwardly flow can be used.

3. Membrane Separation System

Referring to FIG. 4, membrane separation system 300 includes a reactor 302, heat exchangers 304 and 306, condenser 308, membrane separation unit 310, and scrubber 312. Gaseous reactant stream 314 that includes S(g) and $CO_2$(g) enters reactor 302 through reactor inlet 316. Flow of the gaseous reactant stream can be regulated using valve 318. Valve 318 can be a mixing valve or 3-way valve that allows other streams to mix with the gaseous reactant stream 314 as they enter the reactor 302. In some embodiments, a gaseous sulfur stream and a gaseous carbon dioxide stream enter valve 318 or reactor 302 through separate inlets. In reactor 302, the gaseous reactant stream 314 is heated at temperatures and pressures described throughout this Specification to produce the gaseous product stream 320. In some embodiments, the gaseous reactant stream 314 is contacted in a reaction zone with a catalyst described throughout this Specification under sufficient conditions to produce the gaseous product stream 320. The gaseous product stream 320 can include gaseous carbon monoxide, gaseous carbonyl sulfide, and gaseous sulfur dioxide. In some embodiments, the gaseous product stream includes gaseous carbon disulfide and gaseous sulfur. The gaseous product stream 320 can pass through heat exchangers 304 and 306 in a sequential manner and undergo multiple heat exchanges to reduce the temperature of product stream 320. The cooled gaseous product stream 320 can enter the condenser 308, which is at a temperature sufficient to separate liquid $SO_2$ from the gaseous product stream 320 and form liquid sulfur dioxide stream 322 and gaseous product stream 324. In some embodiments, the temperature of the condenser ranges from −150 to −55° C. The liquid sulfur dioxide stream 322 exits condenser 308 and passes through heat exchanger 306 to produce a gaseous sulfur dioxide stream 326. In heat exchanger 306, heat transfer between hot gaseous product stream 320 and liquid sulfur dioxide stream 322 can be sufficient to gasify all, or substantially all, of the sulfur dioxide in the sulfur dioxide stream 326. The gaseous sulfur dioxide stream 326 can be transported to storage units, transported to other processing units to be converted into other commercial products, and/or sold.

The gaseous product stream 324 can exit condenser 308, pass through the heat exchanger 304, the compressor 328, and then enter membrane unit 310. As the gaseous product stream 324 passes through heat exchanger 304, the gaseous product stream 324 is heated by exchange of heat with the hot gaseous product stream 320. Compression of the heated gas product stream 324 can further heat the gaseous product stream 324 to a desired temperature for separation in membrane separation unit 310. In some embodiments, the compressor 328 is not necessary. The heated gaseous product stream 324 enters the membrane separation unit 310 through a feed inlet 330. In the membrane separation unit 310, carbonyl sulfide can be separated from the gaseous product stream 324 to form a carbonyl sulfide stream 332 and a gaseous carbon monoxide stream 334. A portion of the gaseous carbonyl sulfide stream 332 can be transported to other units or to storage units, or sold through conduit 336. A portion of the gaseous carbonyl stream 332 can be provided to the valve 318, mixed with the gaseous reactant stream 314 and feed to reactor 316. In some embodiments, a gaseous sulfur stream, a gaseous carbon dioxide stream and a gaseous carbonyl sulfide stream, or combinations thereof are provided directly as single streams or mixtures of streams to the reactor 302. The gaseous carbon monoxide stream 334 can enter the scrubber 312. In the scrubber 312, residual amounts of carbonyl sulfide and/or sulfur dioxide can be removed from the gaseous carbon monoxide stream 334 to produce purified a carbon monoxide stream 338. The scrubber 312 can be any known scrubber system capable of separating COS and $SO_2$ from CO. For example, the scrubber 312 may be an aqueous treatment system. Waste product stream containing carbonyl sulfide, sulfur dioxide, and water can exit the scrubber system 312 through the waste outlet 336 and disposed of using known disposal methods. The purified carbon monoxide stream 338 can exit scrubber 312 through scrubber outlet 340 and be transported to other units for further processing into commercial products, stored, or sold.

4. Cryogenic Separation System

Referring to FIG. 5, cryogenic separation system 400 includes the reactor 302, heat exchangers 304, 306, and 402, the condenser 308, and the cryogenic separation unit 404. The gaseous reactant stream 314 that includes S(g) and $CO_2$(g) enters the reactor 302 through the reactor inlet 316. Flow of the gaseous reactant stream can be regulated using the valve 318 as described above. In the reactor 302, the gaseous reactant stream 314 is heated at temperatures and pressures described throughout this Specification to produce a product stream 320. The gaseous product stream 320 can pass through the heat exchangers 304 and 306 to undergo multiple heat exchanges to reduce the temperature of the product stream 320. The gaseous product stream 320 can enter the condenser 308, which is at a temperature sufficient to separate liquid $SO_2$ from the gaseous product stream 320 and form the liquid sulfur dioxide stream 322 and the gaseous product stream 324. In some embodiments, the temperature of the condenser ranges from −150 to −55° C. The liquid sulfur dioxide stream 322 exits the condenser 308 and can undergo heat exchange in the heat exchanger 306 to produce the gaseous sulfur dioxide stream 326. In heat exchanger 306, the hot gaseous product stream 320 can be used as the working fluid to provide heat to the liquid sulfur dioxide stream 322 to sufficiently to gasify all, or substantially gasify all, of the liquid sulfur dioxide in the sulfur dioxide stream 326 to gaseous sulfur dioxide. The gaseous sulfur dioxide stream 326 can be transported to storage units, transported to other processing units to be converted into other commercial products, and/or sold.

The gaseous product stream 324 can exit condenser 308 and pass through the heat exchanger 402. Heat exchange in the heat exchanger 402 can cool the gaseous product stream 324. For example, the temperature of the working fluid in the heat exchanger 308 can be about −50° C. The gaseous product stream 324 can enter cryogenic separation unit 404 through cryogenic separation inlet 406. In some embodiments, heat exchanger 402 is not used, and gaseous product stream 324 enter cryogenic separation inlet 410. In cryogenic separation unit 404, carbon monoxide is separated from gaseous product stream 324 to form a carbon monoxide stream 408. The cryogenic separation unit 404 may have 2 to 100, 20 to 50, or 30 to 40 distillation plates and be operated at temperatures and pressures sufficient to separate carbon monoxide from gaseous product stream 324. For example, cryogenic distillation can be operated as a temperature of −140 to −55° C. The purified carbon monoxide stream 408 can exit the cryogenic separation unit 404 through a gas outlet 410, pass through heat exchanger 304 and be transported to storage units, other process facilities or sold as a commercial product. Carbon monoxide stream 408 can have 90 to 100%, or preferably 100% by volume carbon monoxide. While passing through heat exchanger 304, the cold carbon monoxide stream 408 may cool the hot gaseous product stream 320 exiting reactor 302 and, thus improve the heat efficiency of the system. In some embodiments, the carbon monoxide stream 408 does not pass through heat exchanger 304. In cryogenic separation unit 404, the conditions are sufficient to liquefy or partially liquefy carbonyl sulfide (i.e., at temperatures below the boiling point of carbonyl sulfide (about −50° C.) and form a liquid carbonyl sulfide stream 412. The liquid carbonyl sulfide stream 412 can exit the cryogenic separation unit 404 through liquid outlet 414 and pass through heat exchanger 402. In the heat exchanger 402, the liquid carbonyl sulfide stream 412 is gasified to form gaseous carbonyl sulfide stream 416. The heat in heat exchanger 402 can be provided from the gaseous product stream 324, thus maximizing the heat efficiency of the cryogenic distillation system 400. The gaseous carbonyl stream 416 can enter valve 318 and be mixed with a gaseous reactant stream 314 to continue the process cycle. In some embodiments, the gaseous carbonyl stream 416 directly enters the reactor 302.

With respect FIGS. 2-5, not all conduits and vessel inlets and outlets are described as it should be understood that the units described in the figures have inlets, outlets and conduits that in fluid communication. It should also be understood that the arrangement of the components in the systems can be combined and/or used in a different order.

D. Catalysts and Reaction Conditions

Catalytic material used in the context of this invention may be the same catalysts, different catalysts, or a mixture of catalysts. The catalysts may be supported or unsupported catalysts. The support may be active or inactive. The catalyst support can include refractory oxides, alumina oxides, aluminosilicates, silicon dioxide, metal carbides, metal nitrides, sulfides, or any combination thereof. Non-limiting examples of such compounds includes MgO, $Al_2O_3$, $SiO_2$, $Mo_2C$, TiC, CrC, WC, OsC VC, $Mo_2N$, TiN, VN, WN, CrN, $Mo_2S$, ZnS, and any combination thereof. All of the support materials can be purchased or be made by processes known to those of ordinary skill in the art (e.g., precipitation/co-precipitation, sol-gel, templates/surface derivatized metal oxides synthesis, solid-state synthesis, of mixed metal oxides, microemulsion technique, solvothermal, sonochemical, combustion synthesis, etc.). One or more of the catalysts can include one or more metals or metal compounds thereof. The metals that can be used in the context of the present invention to create bulk metal oxides, bulk metal sulfides, or supported catalysts include a metal from Group IIA or compound thereof, a metal from Group IB or compound thereof, a metal from Group IIIB or compound thereof, a metal from Group IVB or compound thereof, a metal from Group VIB or compound thereof, a metal from Group VIII or compound thereof, at least one lanthanide or compound thereof, or any combination thereof. The metals or metal compounds can be purchased from any chemical supplier such as Sigma-Aldrich® (USA), Alfa-Aeaser (USA), Strem Chemicals (USA), etc. Group IIA metals (alkaline-earth metals) and Group IIA metal compounds include, but are not limited to, Mg, MgO, Ca, CaO, Ba, BaO, or any combinations thereof. Group IB metals and Group IB metal compounds include, but are not limited to, Cu and CuO. Group IIB metals include zinc or zinc sulfide. Group IIIB metals and Group IIIB metal compounds include, but are not limited to, Sc, $Sc_2O_3$, the lanthanides or lanthanide compounds, or any combination thereof. Lanthanides that can be used in the context of the present invention to create lanthanide oxides include La, Ce, Dy, Tm, Yb, Lu, or combinations of such lanthanides. Non-limiting examples of lanthanide oxides include $CeO_2$, $Dy_2O_3$, $Tm_2O_3$, $Yb_2O_3$, $Lu_2O_3$, or $La_2O_3$, or any combination thereof. Lanthanide oxides can be produced by methods known in the art such as by high temperature (e.g., >500° C.) decomposition of lanthanide salts or by precipitation of salts into respective hydroxides followed by calcination to the oxide form. Group IVB metals and Group IV metal compounds include, but are not limited to, Zr and $ZrO_2$. Group VIB metals and Group VI metal compounds include, but are not limited to, Cr, $Cr_2O_3$, Mo, MoO, $Mo_2O_3$, or any combination thereof. Group VIII metals and metal compounds include, but are not limited to, Ru, $RuO_2$, Os, $OsO_2$, Co, $Co_2O_3$, Rh, $Rh_2O_3$, Ir, $Ir_2O_3$, Ni, $Ni_2O_3$, Pd, $Pd_2O_3$, Pt, $Pt_2O_3$, or combinations thereof. The catalytic material can be subjected to conditions that results in sulfurization of the metal in the catalytic material. Non-limiting examples of metal that can be sulfided prior to use are Co, Mo, Ni and W. The catalyst material can, in some instances include a promoter compound. A non-limiting example of promoter compound is phosphorus. A non-limiting example of a catalyst that includes a promoter compound is catalyst material that includes Mo—Ni—P. In some instances, the metal oxides described herein can be of spinel (general formula: $M_3O_4$), olivine (general formula: $M_2SiO_4$) or perovskite (general formula: $M^1M^2O_3$) classification.

The catalyst used in the present invention is sinter and coke resistant at elevated temperatures, (e.g., 445° C. to 3000° C., 900 to 2000° C., or 1000 to 1600° C.). Further, the produced catalysts can be used effectively in reaction of sulfur with carbon dioxide at a pressure of 1 to 25 bar, and/or at a gas hourly space velocity (GHSV) range from 1000 to 100,000 $h^{-1}$.

E. Further Processing of Products

1. CO Processing

The carbon monoxide produced using the method of the invention can be partially converted into $H_2$ through water gas shift reaction for the production of syngas of desired $H_2/CO$ ratio as shown in equation (13). The produced $CO_2$ can be used in the current process to produce more carbon monoxide. This provides an efficient, economic, and novel method to convert a greenhouse gas ($CO_2$) into value added and useful products.

$$CO+H_2O \rightarrow H_2+CO_2 \quad (13)$$

2. $SO_2$ Processing

The sulfur dioxide produced using the method of the invention can be converted to $SO_3$, which can be further processed into sulfuric acid and ammonium sulfate as shown in the equations (14) through (17).

$$SO_2+\tfrac{1}{2}O_2 \rightarrow SO_3 \quad (14)$$

$$SO_3+H_2SO_4 \rightarrow H_2S_2O_7 \quad (15)$$

$$H_2S_2O_7+H_2O \rightarrow 2H_2SO_4 \quad (16)$$

$$2NH_3+H_2SO_4 \rightarrow (NH_4)_2SO_4 \quad (17)$$

3. COS Processing

The carbonyl sulfide produced using the method of the invention can be used in the production of thiocarbamates. Thiocarbamates can be used in commercial herbicide formulations. The method of the invention provides an advantage over commercially prepared COS, which is synthesized by treatment of potassium thiocyanide and sulfuric acid as shown in equation (18).

$$KSCN+2H_2SO_4+H_2O \rightarrow KHSO_4+NH_4HSO_4+COS \quad (18)$$

The conventional treatment produces potassium bisulfate and ammonium bisulfate which needs to be separated, which is a difficult and time consuming process. The method of the invention provides an efficient and economic method solution to the production of COS.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Equilibrium Calculations of Reactions

Figure 6:
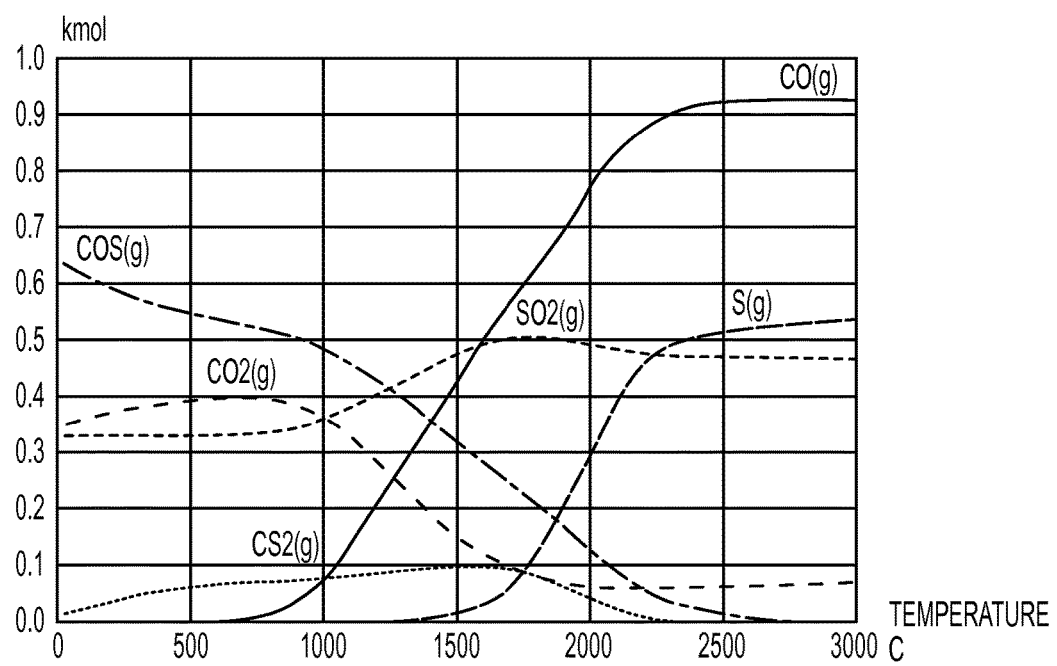
FIG. 6 are plots of the equilibrium composition of different gaseous products of the present invention with a feed composition of 1 kmol $CO_2$ (g) and 1 kmol $S(g)$.
Figure 7:
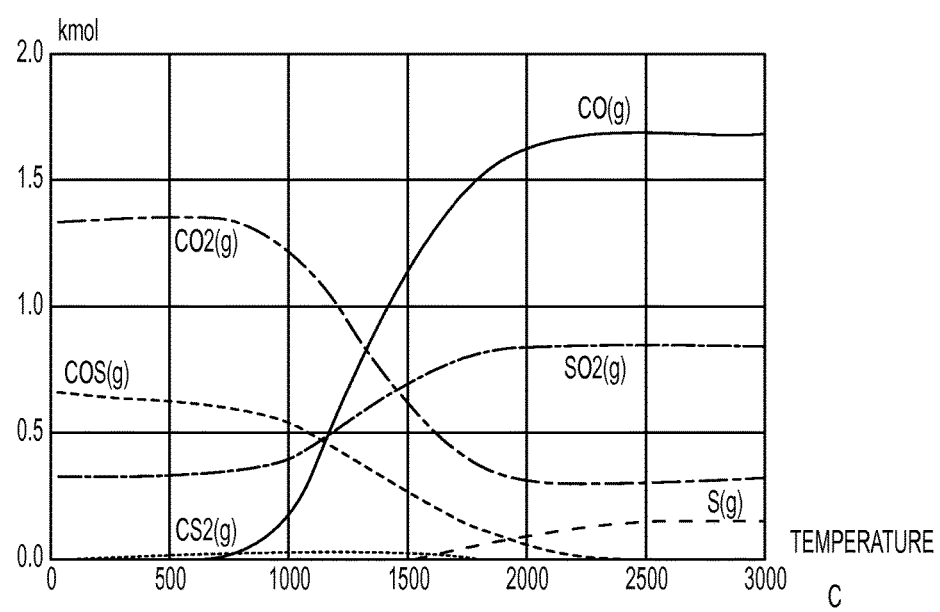
FIG. 7 are plots of the equilibrium composition of different gaseous products of the present invention with a feed composition of 2 kmol $CO_2$ (g) and 1 kmol $S(g)$.
Figure 8:
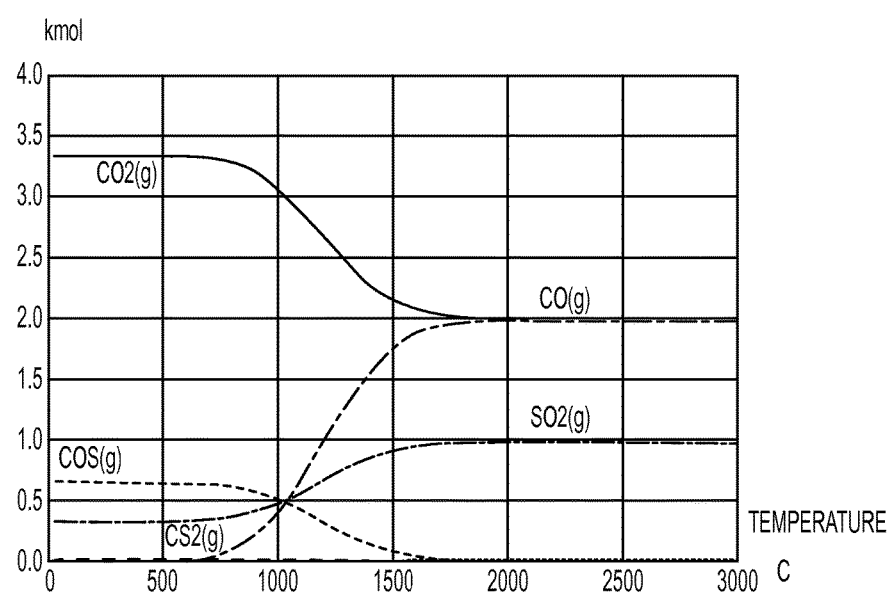
FIG. 8 are plots of the equilibrium composition of different gaseous products of the present invention with a feed composition of 4 kmol $CO_2$ (g) and 1 kmol $S(g)$.
Figure 9:
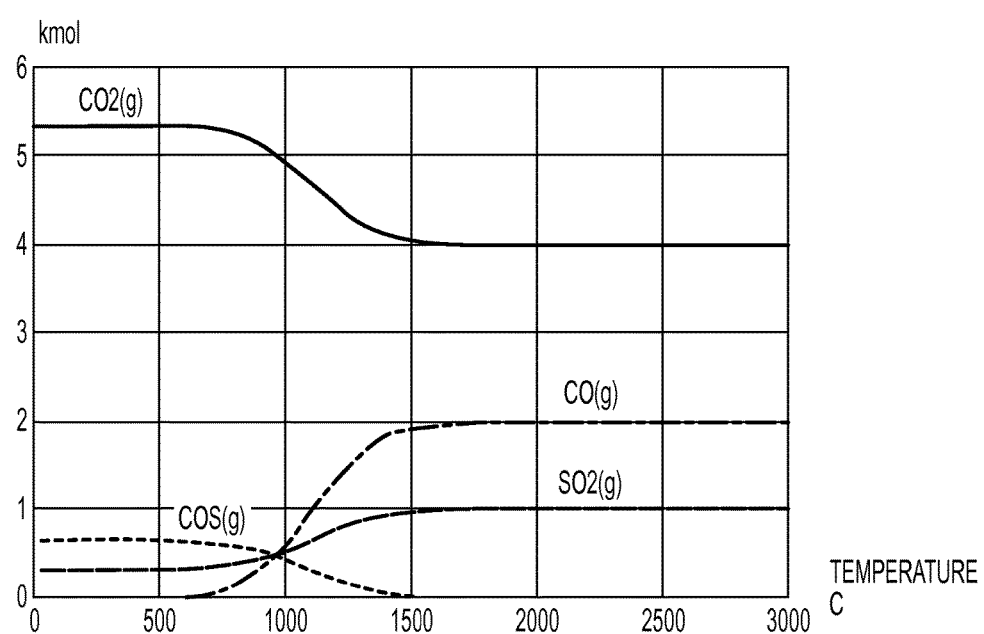
FIG. 9 are plots of the equilibrium composition of different gaseous products of the present invention with a feed composition of 6 kmol $CO_2$ (g) and 1 kmol $S(g)$.
Figure 10:
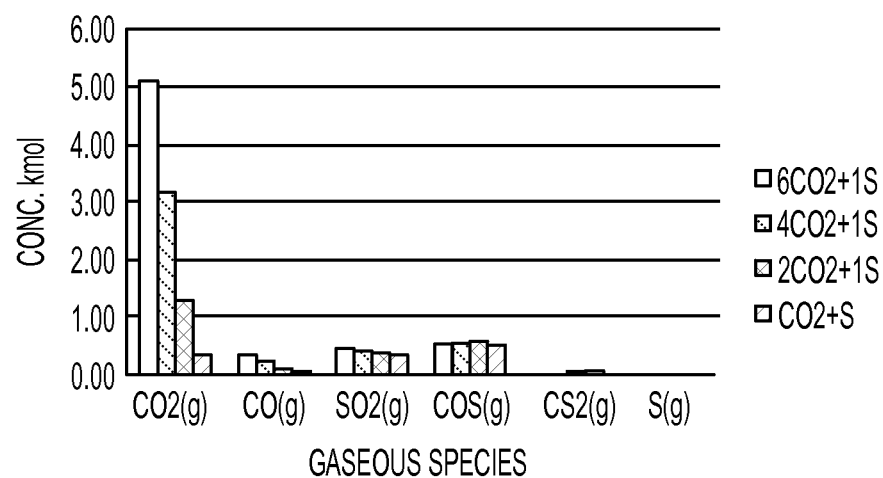
FIG. 10 are bar graphs of equilibrium composition of product gases of the present invention at 918° C. and 1 bar with four different feed gas compositions.
Figure 11:
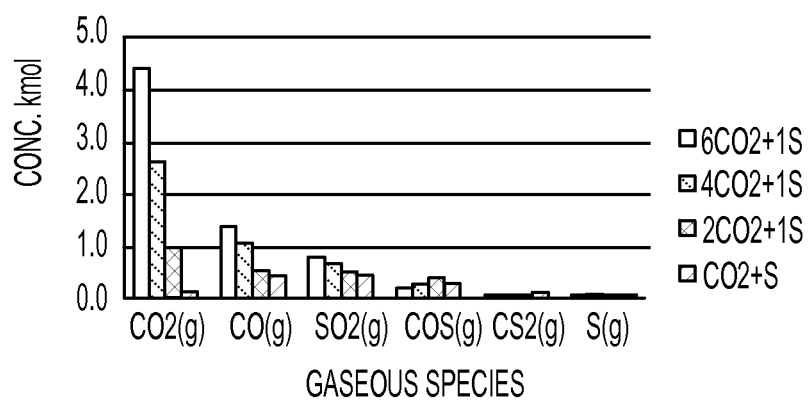
FIG. 11 are bar graphs of equilibrium composition of product gases of the present invention at 1220° C. and 1 bar with four different feed gas compositions.
Figure 12:
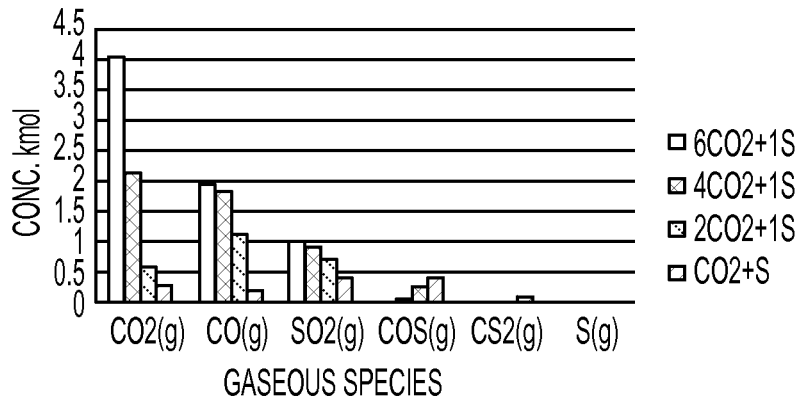
FIG. 12 are bar graphs of equilibrium composition of product gases of the present invention at 1500° C. and 1 bar with four different feed gas compositions.
Figure 13:
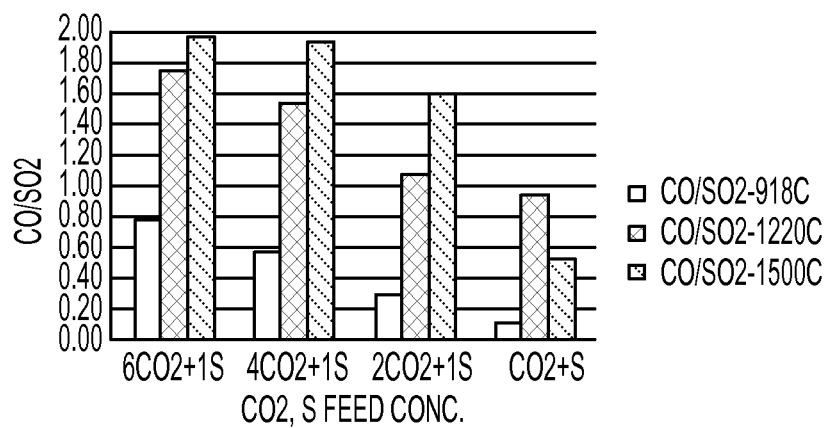
FIG. 13 are bar graphs of the ratio of $CO/SO_2$ in equilibrium mixture of the present invention at three different temperatures and four different feed compositions.
Figure 14:
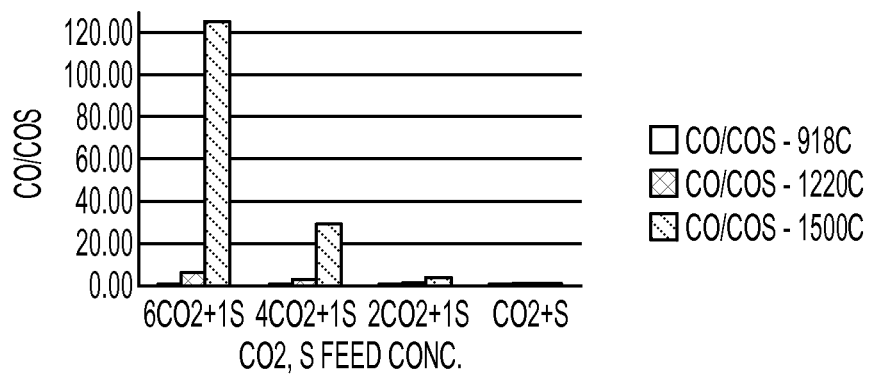
FIG. 14 are bar graphs of the ratio of CO/COS in the equilibrium reaction mixture of the present invention at three different temperatures and four different feed compositions.
Figure 15:
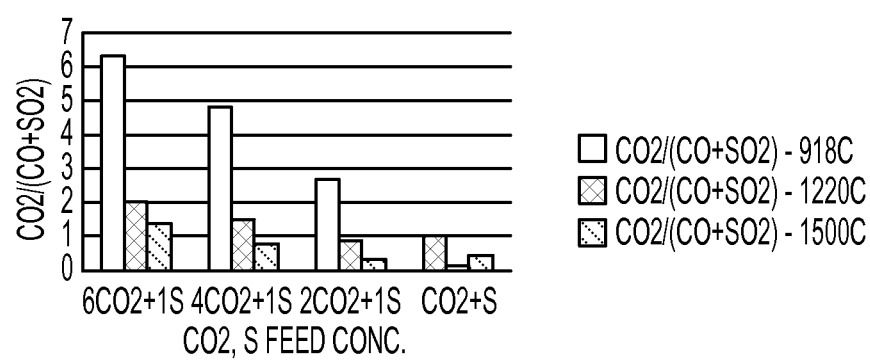
FIG. 15 are bar graphs of the ratio of $CO_2/(CO+SO_2)$ in equilibrium mixture of the present invention at three different temperatures and four different feed compositions.

Multiphase equilibrium composition calculation was done by using HSC Chemistry 7.1 software (Outotec Oyi, Espoo, Finland). The parameters used in the calculations were ratios of gaseous carbon dioxide to gaseous sulfur ranging from 6:1 to 1:1 at temperatures between 0-3000° C. FIGS. 6-9 are graphs of the calculated equilibrium composition obtained by treating different ratios of $CO_2$ with gaseous S at temperatures from 0 and 3000° C. FIGS. 10-12 are graphs of the amount of different gaseous species at equilibrium conditions between four different feed ratios of $CO_2/S$ were compared at three different temperatures. FIGS. 13-15 are bar graphs of various product ratios in the equilibrium reaction mixture at three different temperatures and four different feed compositions. FIG. 5 are plots of the equilibrium composition of different gaseous species with a feed composition of 1 kmol $CO_2$ (g) and 1 kmol S(g). FIG. 7 are plots of the equilibrium composition of different gaseous species with a feed composition of 2 kmol $CO_2$ (g) and 1 kmol S(g). FIG. 8 are plots of the equilibrium composition of different gaseous species with a feed composition of 4 kmol $CO_2$ (g) and 1 kmol S(g). FIG. 9 are plots of the equilibrium composition of different gaseous species with a feed composition of 6 kmol $CO_2$ (g) and 1 kmol S(g). The calculated results demonstrate that gaseous 'S' reacts with $CO_2$ to form equilibrium mixture of $SO_2$, CO, $CS_2$ and COS in different amounts at different temperature. Referring to FIGS. 6 and 7, it was found that when the $CO_2/S$ ratio was 1 and 2, small amount of $CS_2$ forms. Referring to FIGS. 8 and 9, it was found that when the $CO_2/S$ ratio was 4 to 6, $CS_2$ did not form at any temperature. It was also found that $SO_2$ formed between 0-3000° C. in considerable quantity between 0-3000° C. when the $CO_2/S$ ratio is 1, but as the ratio increased from 2-6, the amount of $SO_2$ below 1000° C. became nearly ⅓ of that of at high temperature of above 1500° C.

The amount of different gaseous species at equilibrium conditions between four different feed ratios of $CO_2/S$ were compared and plotted in FIGS. 10-15. FIG. 10 are bar graphs of equilibrium composition of product gases at 918° C. and 1 bar with four different feed gas compositions. FIG. 11 are bar graphs of equilibrium composition of product gases at 1220° C. and 1 bar with four different feed gas compositions.

FIG. 12 are bar graphs of equilibrium composition of product gases at 1500° C. and 1 bar with four different feed gas compositions. FIG. 13 are bar graphs of the ratio of $CO/SO_2$ in equilibrium mixture at three different temperatures and four different feed compositions. FIG. 14 are bar graphs of the ratio of CO/COS in the equilibrium reaction mixture at three different temperatures and four different feed compositions. FIG. 15 are bar graphs of the ratio of $CO_2/(CO+SO_2)$ in equilibrium mixture at three different temperatures and four different feed compositions. From the obtained data, reaction temperatures and the $CO_2/S$ ratio can be determined to produce the desired products. Referring to FIG. 13, it was determined that to obtain high $CO/SO_2$ at a $CO_2/S$ ratio of 1:1, reaction temperatures of 1200° C. are preferred. Referring to FIG. 14, it was determined that to obtain high CO/COS ratio, it is preferable to have a $CO_2/S$ ratio of 6 and temperature of 1500° C. or 1200° C. Referring to FIG. 15, the $CO_2/(CO+SO_2)$ ratio can be altered depending upon the final application this can be applied.

The equilibrium calculations and the obtained results demonstrate that the method and systems of the present invention reaction of gaseous carbon dioxide and gaseous sulfur provides carbon monoxide and sulfur dioxide in an efficient manner and converts a greenhouse product into useful commercial products.

Example 2

Production of CO and $SO_2$ with Recycle of COS

General Procedure.

Experiments were conducted at 800° C. and 900° C. in a saturator reactor using $MoS_2$ and ZnS catalysts to produce CO and $SO_2$ with recycle COS to limit the further production of COS. A gaseous mixture of $CO_2$ (25 ml/min) Ar (25 ml/min) was passed through the saturator reactor containing molten sulfur held at 180° C. The sulfur saturated gaseous $CO_2$ and Ar mixture was passed over the $MoS_2$ or ZnS catalyst (500 mg) held at 800° C. and 900° C. Both ZnS and $MoS_2$ were procured from Sigma-Aldrich®, USA. Table 3 lists the physical and kinetic parameters of the catalysts and the reactions.

TABLE 3

| Parameters | ZnS | $MoS_2$ |
| --- | --- | --- |
| Surface area (BET) | 20.7 m$^2$/g | 3.6 m$^2$/g |
| Pore volume (BJH) | 0.082 cm$^3$/g | 0.026 cm$^3$/g |
| Pore diameter(4V/A) (BJH) | 14.0 nm | 30.4 nm |
| Ea, kJ/mol | 27.5 | 30 |
| $R_{CO2}$, mol/g.s (900° C.) | 5.63 × 10$^{-7}$ | 5.43 × 10$^{-7}$ |

Ea = activation energy and $R_{CO2}$ = rate of $CO_2$ decomposition $MoS_2$ Catalyst.

Figure 16:
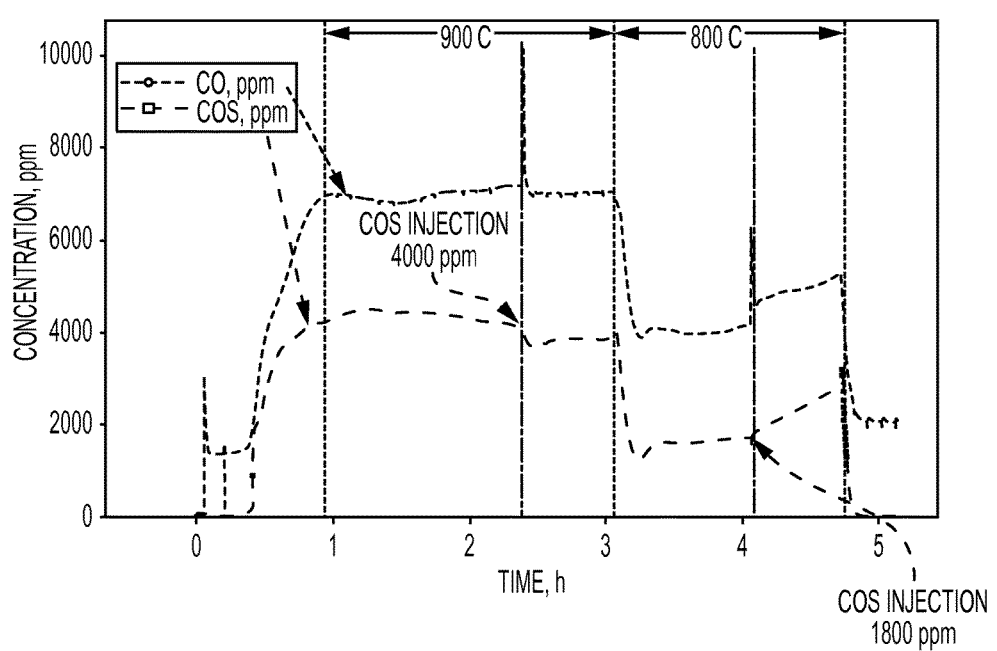
FIG. 16 shows graphs of the effect of COS recycling the presence of a $Mo_2S$ catalyst at two different temperatures in a system of the present invention.

In the saturation reactor, the temperature was raised to 900° C. in presence of $CO_2$ and S mixture and held at that temperature for about 1.5 hrs to produce COS (4000 ppm), CO (7000 ppm) and $SO_2$ (5000 ppm). The produced COS (4000 ppm) was recycled through the saturation reactor. Results from the production of CO and $SO_2$ from a $MoS_2$ catalyst with recycle of COS at two different temperatures is shown in FIG. 16. The top line is CO production and the bottom line is COS production. The product stream was further monitored for 45 minutes and it was determined (See, FIG. 16, time frame between 2 and 3 hours) that the addition of COS in feed steam did not result in an increase in the COS concentration in the product stream. Thus, recycling COS at 900° C. over the $MoS_2$ catalyst inhibited formation of more COS due to reaction between CO and S.

To determine the effect of the catalyst on the COS production at lower temperatures, the addition of 4000 ppm COS to the $CO_2$ and S feed stream was stopped, the reactor temperature was reduced to 800° C., and product gas stream was monitored for about 60 min. At this condition, nearly COS (1800 ppm) was produced. The produced COS (1800 ppm) was fed through the reactor and outlet gas stream was monitored for 50 minutes. It was observed that the COS concentration in the outlet stream gradually increases over time. (See, FIG. 16, time frame between 4 and 5 hours). Thus, recycling COS at 800° C. did not inhibit formation of COS due to the reaction between CO and S.

ZnS Catalyst.

Figure 17:
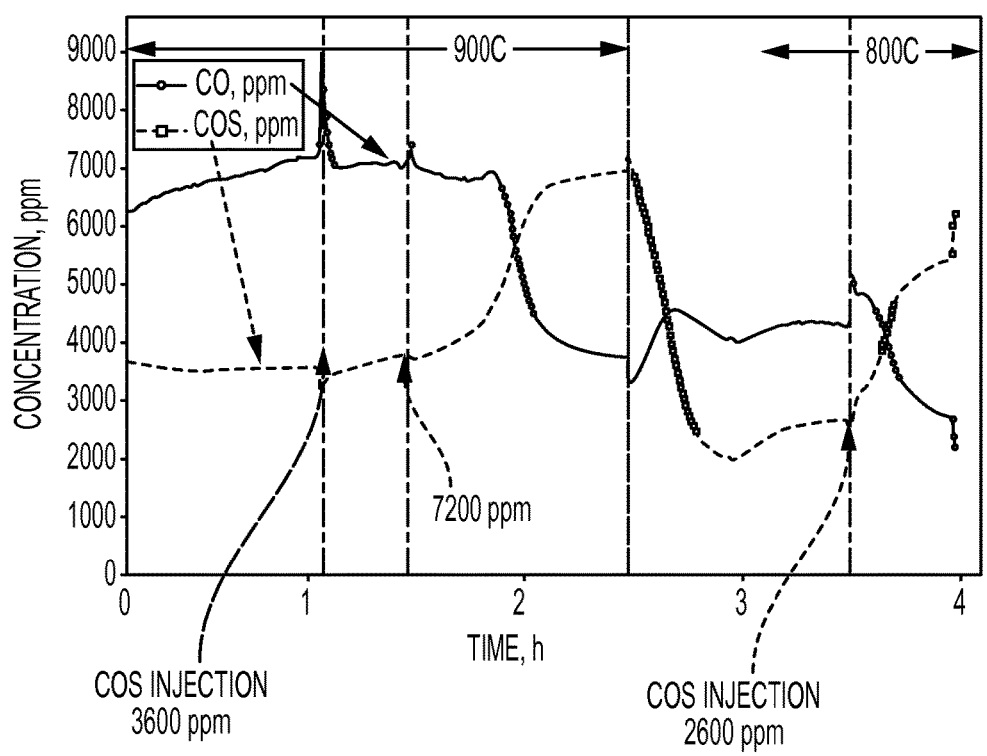
FIG. 17 shows graphs of the effect of COS recycling in the presence of a Mo$_2$S catalyst at two different temperatures in the present invention in a system of the present invention.

In the saturation reactor, the temperature was raised to 900° C. in presence of $CO_2$ and S mixture and held at that temperature for about 1.1 hrs to produce COS (3600 ppm), CO (7200 ppm) and $SO_2$ (5140 ppm). The produced COS (3600 ppm) was recycled through the saturation reactor for Results from the production of CO and $SO_2$ from a ZnS catalyst with recycle of COS at two different temperatures is shown in FIG. 17. The top line is CO production and the bottom line is COS production. The product stream was further monitored for 20 minutes and it was determined (See, FIG. 16, time frame between 2 and 3 hours) that the addition of COS in feed steam did not result in an increase in the COS concentration in the product stream. Thus, recycling COS at 900° C. over the ZnS catalyst inhibited formation of more COS due to reaction between CO and S. After 20 minutes, the COS concentration was doubled to 7200 ppm instead of 3600 ppm and outlet gas stream was monitored for 60 minutes. At these conditions, the COS concentration increased and CO concentration decreased with time. These results proved that having equilibrium amount of COS in the feed stream overcomes further formation of COS due to the reaction between CO and S, and having more than an equilibrium amount hinders formation of CO as well.

To determine the effect of the catalyst on the COS production at lower temperatures, the addition of COS (7500 ppm) to the $CO_2$ and S feed stream was stopped, the reactor temperature was reduced to 800° C., and product gas stream was monitored for about 60 min. At this condition, nearly COS (2600 ppm) was produced. The produced COS (2600 ppm) was fed through the reactor and outlet gas stream was monitored for 30 minutes. It was observed that the COS concentration in the outlet stream gradually increases over time. (See, FIG. 17, time frame between 4 and 3 hours). Thus, recycling COS at 800° C. did not inhibit formation of COS due to the reaction between CO and S.

In summary, ZnS and $MoS_2$ were found to catalytically dissociate $CO_2$ at temperature above 600° C. in presence of metallic sulphur. COS was a major byproduct and its production was controlled by separation and recycling. Recycling the COS over ZnS or $MoS_2$ at 900° C. overcame further formation of COS due to the reaction between CO and S.

The invention claimed is:

1. A method of producing carbon monoxide (CO) and sulfur dioxide ($SO_2$), the method comprising:
    (a) obtaining a reaction mixture comprising carbon dioxide gas ($CO_2(g)$) and elemental sulfur gas (S(g)); and
    (b) contacting the reaction mixture with a catalyst under conditions sufficient to produce a product stream comprising CO(g), COS(g), and $SO_2$(g), wherein the catalyst comprises a metal, a metal oxide, a metal sulfide from Groups IIA, IB, IIB, IIIB, IVB, VIB, VIII, a lanthanide, lanthanide oxide, or any combination thereof, wherein the conditions comprise a temperature of at least 445° C., a pressure of 1 to 25 bar and a gas hourly space velocity (GHSV) of 1,000 to 100,000 h$^{-1}$.

2. The method of claim 1, wherein the product stream further comprises $CO_2(g)$.

3. The method of claim 1, wherein the product stream further comprises carbon disulfide ($CS_2(g)$).

4. The method of claim 1, wherein the product stream further comprises $CO_2(g)$ and $S(g)$.

5. The method of claim 4, wherein the product stream consists essentially of $CO(g)$, $SO_2(g)$, $COS(g)$, $CO_2(g)$, and $S(g)$ or $CO(g)$, $SO_2(g)$, $COS(g)$, $CS_2(g)$, $CO_2(g)$, and $S(g)$.

6. The method of claim 1, wherein the reaction mixture comprises a $CO_2(g):S(g)$ molar ratio of 1:1 to 6:1.

7. The method of claim 6, wherein the reaction mixture comprises a $CO_2(g):S(g)$ molar ratio of 4:1.

8. The method of claim 7, wherein the product stream does not include $CS_2(g)$.

9. The method of claim 6, wherein the reaction mixture comprises a $CO_2(g):S(g)$ molar ratio of 6:1.

10. The method of claim 9, wherein the product stream does not include $CS_2(g)$.

11. The method of claim 1, wherein the metal sulfide comprises molybdenum or zinc.

12. The method of claim 1, wherein the lanthanide, or lanthanide oxide includes La, Ce, Dy, Tm, Yb, Lu, $CeO_2$, $Dy_2O_3$, $Tm_2O_3$, $Yb_2O_3$, $Lu_2O_3$, or $La_2O_3$, or any combination thereof.

13. The method of claim 1, wherein the catalyst is a bulk metal catalyst.

14. The method of claim 1, wherein the catalyst is a supported catalyst.

15. The method of claim 14, wherein the supported catalyst comprises a metal sulfide, a metal carbide, a metal nitride, or a metal phosphate, and any combination thereof.

16. The method of claim 1, wherein hydrogen gas, oxygen gas, methane gas, and water are not included in the reaction mixture.

17. The method of claim 1, wherein the product stream comprises $CO(g)$, $SO_2(g)$ and $COS(g)$, and the COS (g) is recycled to step (b) at a reaction temperature of 900° C. or more.

18. The method of claim 17, wherein recycling the COS (g) inhibits formation of additional COS (g).

19. The method of claim 1, wherein the conditions comprise a temperature of at least 900° C.

20. The method of claim 1, wherein obtaining a reaction mixture comprising carbon dioxide gas ($CO_2(g)$) and elemental sulfur gas ($S(g)$) comprises: heating molten sulfur to produce a $S(g)$ stream, and combing the elemental sulfur gas stream with the $CO_2(g)$ to form the reaction mixture.

* * * * *